Sept. 22, 1953 A. R. WILLARD 2,652,617
MACHINE FOR MANUFACTURING BATTERY PLATES
Filed Oct. 28, 1947 8 Sheets-Sheet 1

INVENTOR.
ALFRED R. WILLARD
BY
Kwis, Hudson, Boughton & Williams
ATTORNEYS

Sept. 22, 1953  A. R. WILLARD  2,652,617
MACHINE FOR MANUFACTURING BATTERY PLATES
Filed Oct. 28, 1947  8 Sheets-Sheet 2

INVENTOR.
ALFRED R. WILLARD
BY
Kwis, Hudson, Boughton & Williams
ATTORNEYS

Sept. 22, 1953

A. R. WILLARD 2,652,617

MACHINE FOR MANUFACTURING BATTERY PLATES

Filed Oct. 28, 1947

INVENTOR.
ALFRED R. WILLARD
BY
Kwis, Hudson, Boughton & Williams
ATTORNEYS

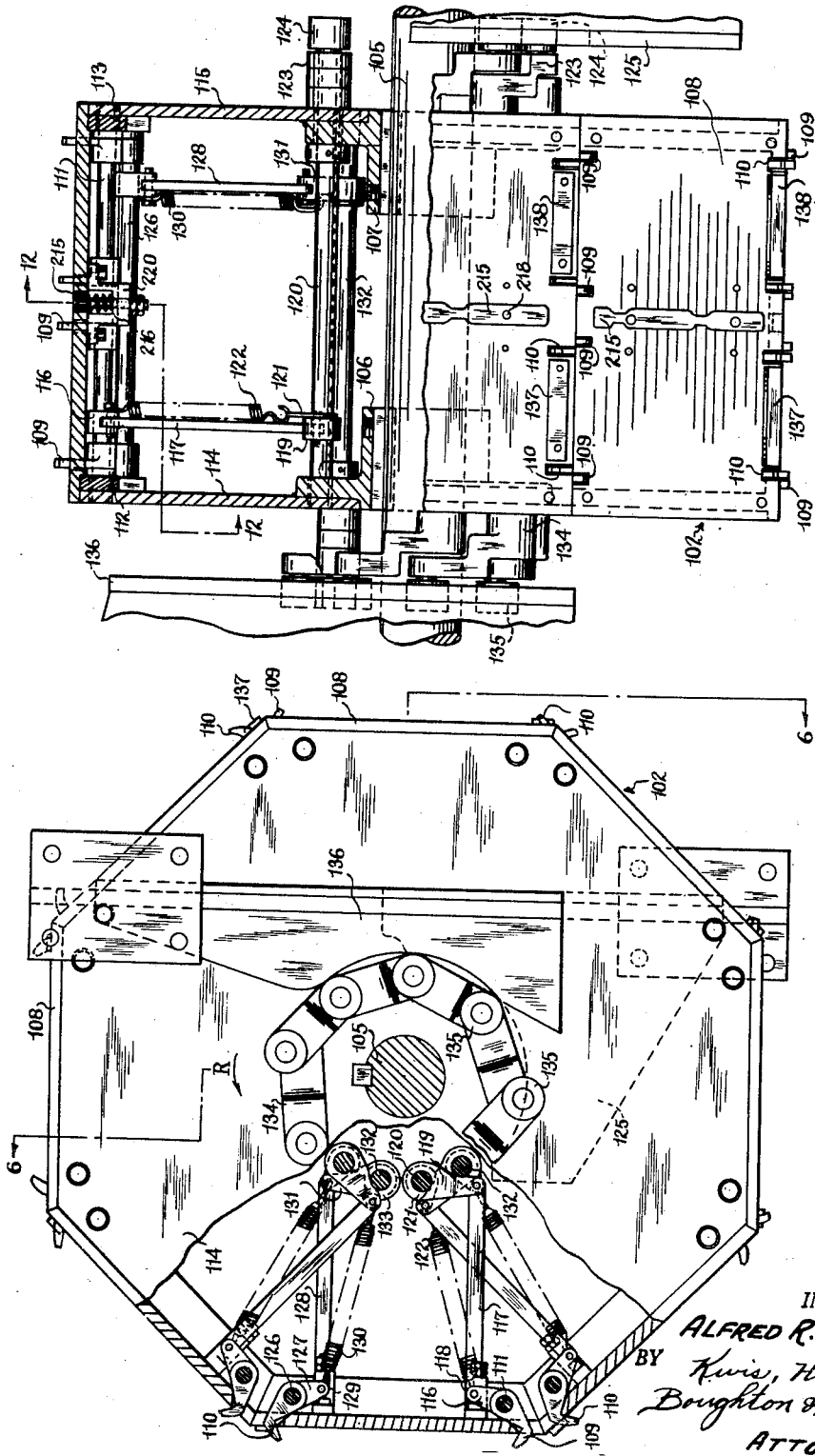

Sept. 22, 1953 A. R. WILLARD 2,652,617
MACHINE FOR MANUFACTURING BATTERY PLATES
Filed Oct. 28, 1947 8 Sheets-Sheet 6

INVENTOR.
ALFRED R. WILLARD
BY
Kwis, Hudson, Boughton & Williams
ATTORNEYS

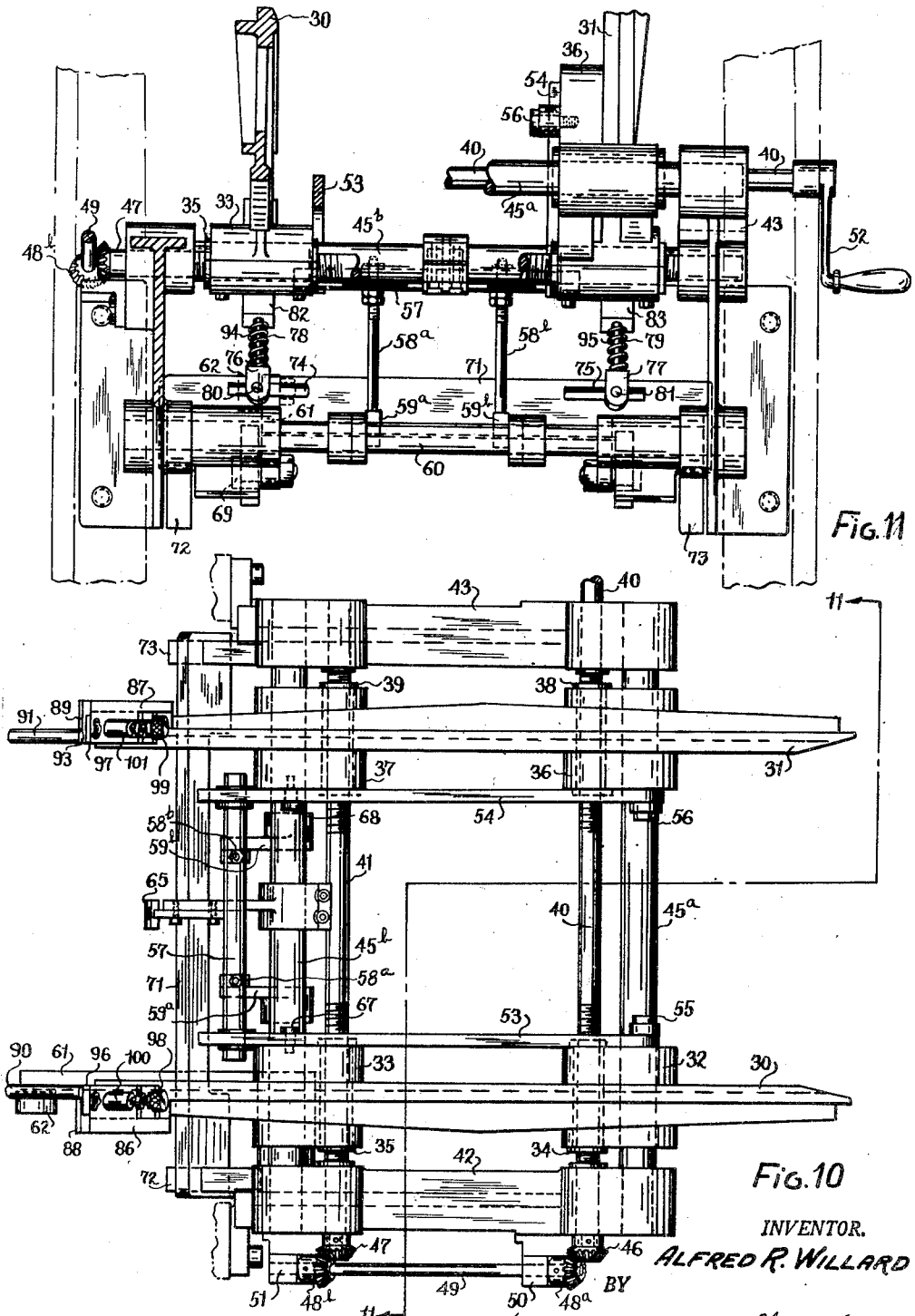

Sept. 22, 1953 A. R. WILLARD 2,652,617
MACHINE FOR MANUFACTURING BATTERY PLATES
Filed Oct. 28, 1947 8 Sheets-Sheet 8

INVENTOR.
ALFRED R. WILLARD
BY
Kwis, Hudson, Boughton & Williams
ATTORNEYS

Patented Sept. 22, 1953

2,652,617

UNITED STATES PATENT OFFICE 2,652,617

MACHINE FOR MANUFACTURING BATTERY PLATES

Alfred R. Willard, East Cleveland, Ohio, assignor to Willard Storage Battery Company, Cleveland, Ohio, a corporation of West Virginia Application October 28, 1947, Serial No. 782,541

51 Claims. (Cl. 29—2)

This invention relates to a machine for use in the manufacture of battery plates such as are commonly employed in storage batteries of lead-acid type and, in particular, to a machine for separating such plates, which are connected together by virtue of their grids having been cast as a unit, and for cleaning and trimming the lugs of the plates prior to their separation.

In the manufacture of plates for storage batteries of the type referred to, the grids which hold the active material, are sometimes cast in pairs joined by a thin web of metal. This facilitates their handling through the pasting and drying machines which, respectively, force the active material, in the form of a paste, into the recesses in the grids and dry the pasted plates. Before the pasted and dried plates are assembled into groups the twin or double plates are separated or broken apart and the lugs thereon trimmed and cleaned.

An object of this invention is to provide a new and improved, simple, comparatively small, and compact machine for separating pairs of battery plates, of the character referred to, in a more efficient manner and with less injury to the plates than heretofore possible.

Another object of the invention is to provide a new and improved machine of the continuous type for separating storage battery plates of the character referred to wherein the plates are rigidly and firmly held against vibration and other undesired and injurious movement while traveling through the machine so that the separation is effected without injury to the plates even though they be relatively thin and their grids formed of a relatively soft alloy.

A further object of the invention is to provide a machine of the type defined in the two preceding objects and in which novel means are provided to trim and clean the lugs of the plates prior to their separation.

A still further object of the invention is the provision of a new and improved machine for separating storage battery plates of the character referred to, which are connected by an intermediate portion or web cast integral with their grids, which machine employs a polygonally shaped drum upon which the plates are firmly held for cooperation with a rotatable breakout wheel for removing or breaking out the intermediate portion, thus effecting separation of the plates while the drum is rotating, and including means for maintaining the axis of the breakout wheel at substantially a uniform distance from the faces of the polygonal drum as the latter rotates.

It is also an object of the invention to provide an improved machine of the character defined in the preceding object and in which novel and improved means are provided for cleaning the lugs of the plates of excess paste and trimming the same prior to separation of the plates and while the plates are in position upon the polygonal drum, the said cleaning means comprising non-rotatable brushes through which the lugs are passed by the rotation of the drum and which brushes are rocked to maintain their surfaces substantially parallel with the faces of the drum.

The invention further resides in certain novel features of construction and combinations and arrangements of parts, and further objects and advantages thereof will be apparent to those skilled in the art to which it pertains from the following description of the present preferred embodiment thereof, described with reference to the accompanying drawings in which similar reference characters represent corresponding parts throughout the several views and in which:

Fig. 5 is a detached side view of the polygonally shaped drum of the machine illustrated in Figs. 1 to 4 inclusive, a portion of the drum being broken away to more clearly show the plate holding fingers and their operating mechanisms, the stationary cams for effecting the finger operation also being illustrated;

Fig. 6 is an end view of the drum and cams illustrated in Fig. 5, a portion of the drum being broken away substantially on the irregular sectional line 6—6 of Fig. 5 to more clearly show the nature of the finger operating mechanism;

Fig. 10 is a fragmentary top plan view, on an enlarged scale, of the mechanism for feeding the battery plates into the machine proper;

Fig. 11 is a sectional view through the feeding mechanism, the view being taken substantially on the irregular section indicating line 11—11 of Fig. 10;

Figure 13:
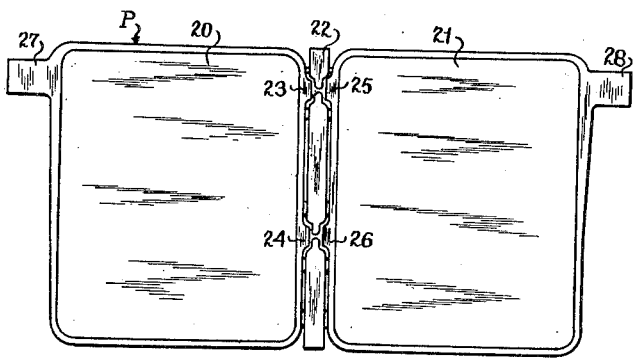
Fig. 13 is a plan view of a conventional double or twin battery plate before the individual plates thereof have been separated.
Figures 14, 15:
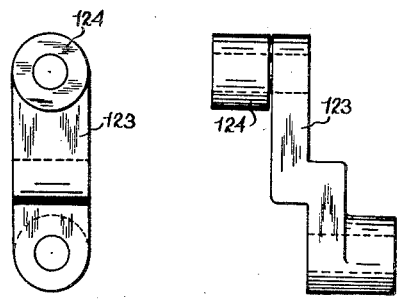
Fig. 14 is a side elevational view of one of the crank arms for operating the finger mechanism associated with the polygonal drum.
Fig. 15 is a front elevational view of the crank arm illustrated in Fig. 14.

Referring to the drawings, Fig. 13 shows identical battery plates 20 and 21 united by a central portion or web 22 cast integral with the grids of the plates, the assembly being designated generally as P. The web joins the plates 20, 21 either at spaced points, or is united substantially continuously therewith by relatively thin portions depending upon the nature of the mold employed in casting the grids. The central portion or web 22 between the two plates 20, 21 is removed in effecting separation of the plates and its removal must be such as to leave unharmed the spaced projections 23, 24, 25 and 26 on the separated plates, which form stub feet for the latter. The plate 20 is also provided with an outwardly projecting lug 27 and a corresponding lug 28 is provided upon the plate 21. These lugs are normally cast of greater length than their desired final size and during the pasting operation some of the paste generally adheres to portions thereof. The lugs must be trimmed to proper length, and the active material which has been deposited thereon removed before the plates are united with connecting straps in a conventional manner to form a plate group.

In employing the machine of this invention for operating upon twin or double plates of the type illustrated in Fig. 13, a quantity of the latter are placed in the feeding portion or hopper 29 of the machine. This feeding hopper comprises a pair of spaced parallel members 30 and 31 which are here illustrated as castings having their upper surface smoothly finished and inclined to receive the lugs 27, 28 of the battery plates and provide a guiding and supporting surface therefor. To provide for plates of different sizes, the lower portion of the member 30 is provided with enlarged two-part bosses 32 and 33 in which are clamped nuts 34 and 35, respectively. The member 31 is similarly provided with enlarged two-part bosses 36 and 37 in which nuts 38 and 39 are non-rotatably mounted. An adjusting rod 40 having spaced right and left handed threaded portions thereon, passes through the nuts 34 and 38 and a similarly threaded adjusting rod 41 passes through the nuts 35 and 39. Hence, by rotating the adjusting rods 40 and 41, the width of the space between the members 30 and 31 may be adjusted so that plates of different sizes may be accommodated therebetween.

The adjusting rods 40, 41 are rotatably supported in stationary brackets 42 and 43 which are, in turn, bolted or otherwise secured to a vertically extending portion 44 of the housing or frame for the machine. These brackets are transversely braced by rods or bars 45a and 45b attached to the brackets 42 and 43, these rods being slidable in openings provided therefor in the bosses 32, 33, 36 and 37 of the members 30 and 31. Adjacent ends of the adjusting rods 40 and 41 extend beyond the outer side of the supporting bracket 42 and the outer ends of these rods are provided, respectively, with beveled gears 46 and 47. The gear 46 meshes with a bevel gear 48a while the gear 47 meshes with the bevel gear 48b, the gears 48a and 48b being pinned to a shaft 49 supported upon the bracket 42 by spaced bearing plates 50 and 51. The end of the adjusting rod 40, opposite to that which is provided with the bevel gear 46, has a crank 52 attached thereto by which the rod 40 may be rotated and, through the gears 46, 48a, 48b and 47, the rod 41 will be correspondingly rotated so that the members 30 and 31 are moved towards or away from each other while remaining substantially parallel.

The bottoms of the twin or double battery plates P rest upon rockable spaced bars 53 and 54, see Figs. 1, 4, 10 and 11. The outer ends of these bars are pivotally supported by means of studs 55 and 56 upon the members 30 and 31, respectively, while the inner ends of the bars are provided with downwardly directed lugs or brackets in which a transversely extending rod 57 is slidably supported. Intermediate the bars 53 and 54 the rod 57 is connected with downwardly extending connecting rods 58a and 58b, the upper threaded ends of which pass through spaced holes in the rod 57 and are provided with suitable nuts on either side of the rod 57 to secure the rods 58a and 58b against relative displacement with respect to the rod 57. The lower ends of the rods 58a and 58b are secured to the outer ends of arms 59a and 59b, the inner ends of which are slidably keyed or splined to a transversely extending shaft 60 which is journalled in the brackets 42 and 43 of the feeding mechanism. The shaft 60 is also provided with a bent projecting arm 61 the outer end of which is provided with a roller 62 for cooperation with a cam 63 provided upon a shaft 64.

The construction just described is such that, when the shaft 64 is rotated, the cam 63 causes the arm 61 to be periodically raised and lowered thus rocking the shaft 60. This raises and lowers the rods 58a and 59b and, consequently, the inner ends of the bars 53 and 54. Hence, the twin plates P are periodically jogged or moved up and down with respect to the members 30 and 31, the upper surfaces of which support the lugs of the plates. This continuously repeated action causes the plates to feed or move with respect to the members 30 and 31 of the feeding mechanism since the upper surfaces of these members are inclined towards the operating portion of the machine.

The motion of the twin plates P downwardly along the members 30 and 31 is limited by a fixed stop 65 which projects upwardly into the path of the lower edge of the forward plate in the feeding magazine or hopper, this stop 65 being adjustably carried upon the stationary shaft or rod 45b which is mounted in the brackets 42 and 43. The member 65 determines the innermost position of the twin battery plates P under the influence of the jogging action imparted by the bars 53 and 54, the plates being fed one at a time beyond the stop member 65 and into engagement with a rotating polygonally shaped drum in a manner and for a purpose hereinafter described.

The fact that the outer ends of the bars 53 and 54 are pivoted to the members 30 and 31 enables adjustment of the space between the latter, by means of the crank 52, to likewise adjust the spacing between the bars 53 and 54. In order that the bars will follow the members 30 and 31 throughout their entire length when adjusted, so as to remain parallel therewith, the said bars 53 and 54 are provided with slotted openings adjacent the transversely extending rod 57 and each of these slotted openings receive a headed stud 67 and 68 respectively, the inner ends of which are threaded into the bosses 33 and 37, respectively. Hence the bars 53 and 54 are free to rock in accordance with the operation of the cam 63 and yet are spaced towards or away from each other, when the members 30 and 31 are moved by action of the crank 52, it being remembered that the inner ends of the members 53 and 54 are freely slidable upon the bar 57.

Figure 4:
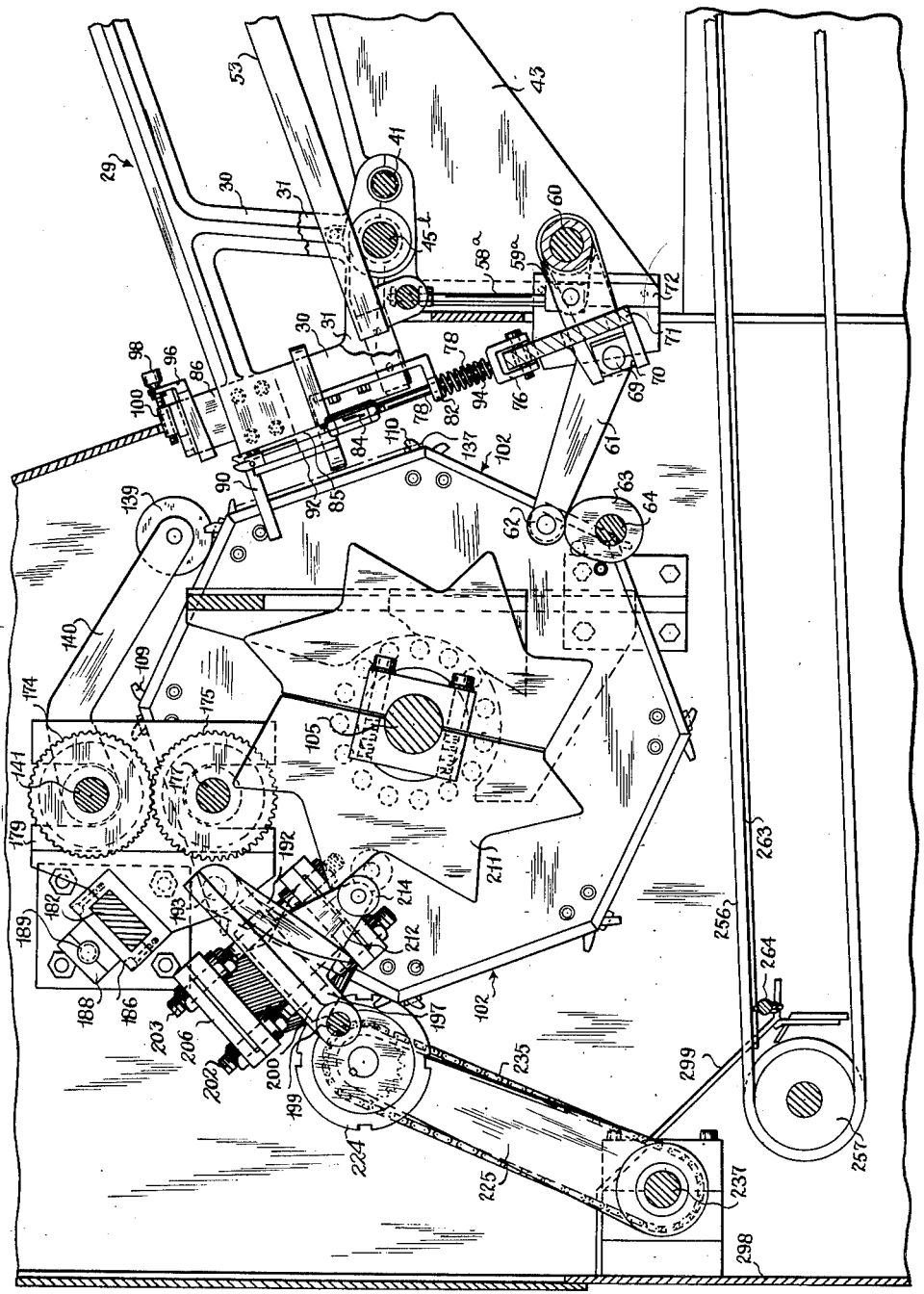
Fig. 4 is a fragmentary sectional view taken substantially on the section line 4—4 of Fig. 2 with a portion of one of the side members of the feeding hopper broken away.
Figure 7:
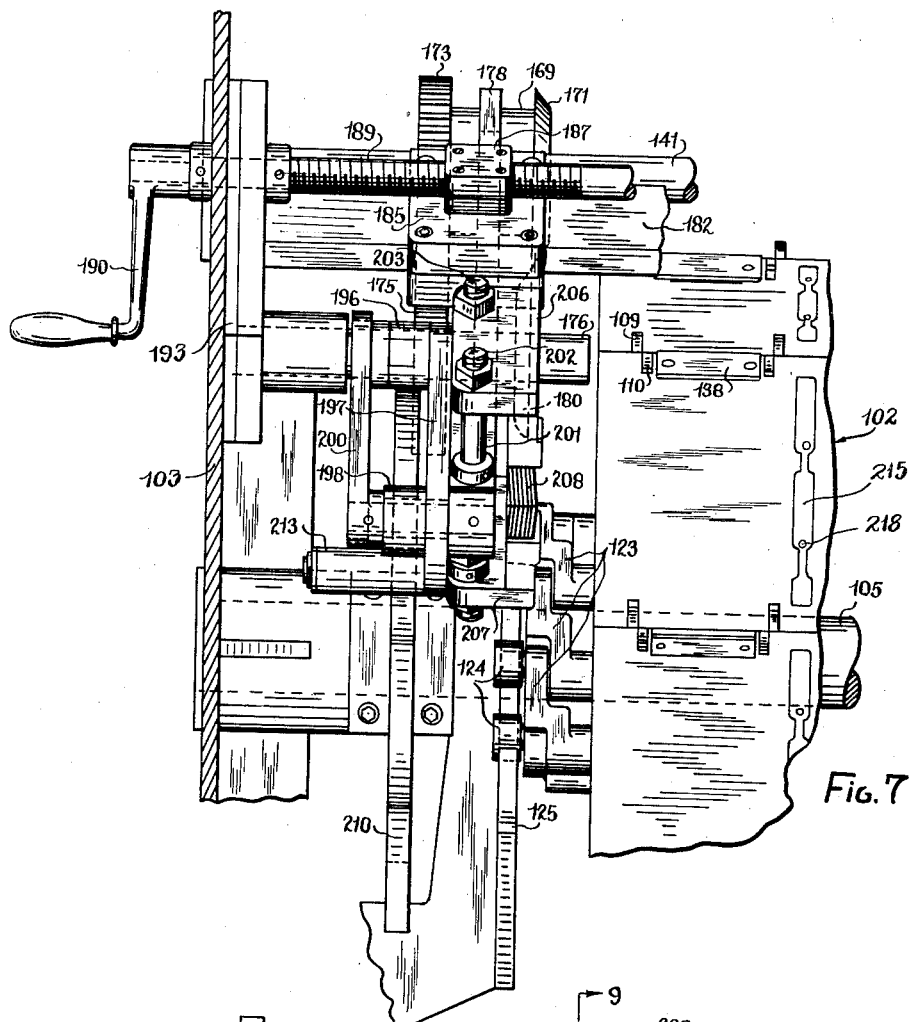
Fig. 7 is an enlarged fragmentary view illustrating one of the lug trimming and lug cleaning mechanisms associated with the polygonally shaped drum and the means for adjusting these mechanisms for operation upon battery plates of different sizes.

The arm or lever 61 is provided intermediate its ends with a projecting stud 69 which rockably supports a quadrilaterally shaped block 70, received within a forked bracket provided adjacent one end of a transversely extending plate 71, see Fig. 4. This plate 71 is guided for movement at substantially right angles with respect to the upper surface of the members 30 and 31 by slotted openings in guide plates 72 and 73 which are secured to the brackets 42 and 43. As shown in Figs. 10 and 11, the plate 71 is provided intermediate its ends and parallel with the top surface thereof, with substantially horizontally extending slotted openings 74 and 75. Straddling the plate 71 are the forked lower ends 76 and 77 of spaced upwardly extending rods 78 and 79, the forked portion 76 and 77 being provided with pins 80 and 81 extending through the slotted openings 74 and 75, respectively, thereby connecting the forked members 76 and 77 to the plate 71 while permitting a limited amount of transverse movement therebetween. The rods 78 and 79 are guided by and extended through brackets 82 and 83 which are connected with the members 30 and 31 respectively. Hence, by this construction adjustment of the spacing between the members 30 and 31 will correspondingly adjust the spacing between the rods 78 and 79, this action being permitted by the slotted openings 74 and 75.

The upper ends of the rods 78 and 79 are provided with adjusting nuts such as 84, see Fig. 4, into the upper ends of which are threaded plate lifting rods such as 85. The plate lifting rods 85 are guided for reciprocation by plate holdback members 86 and 87 provided upon the forward ends of the members 30 and 31, respectively. The forward portions of these plate holdback members 86 and 87 are each provided with an upstanding beveled stop portion 88 and 89, respectively, which are adapted to engage the lugs 27 and 28 of the battery plates as the latter are fed forward by the jogging action of the bars 53 and 54, and the upper ends of the lifting rods 85 are guided in the plate holdback members for reciprocation adjacent these stop portions to sequentially lift the battery plates thereover. This operation is due to the rotation of the cam 63 which causes rocking of the lever or arm 61, so that the stud 69 carried thereby effects reciprocation of the plate 71 which in turn moves the rods 78, 79 and rods 85 connected therewith. The reciprocation of the rods 85 causes the beveled upper ends thereof to engage the lugs of that twin plate P which is resting against the stop portions 88, 89 and lift the lugs sufficiently to pass over the said stop portions, the lugs of the twin plate sliding by gravity downwardly over the beveled surfaces of the rods 85 and the stop members 88 and 89, and onto the forwardly extending bars 90 and 91. These bars are substantially aligned with the top surfaces of the members 30 and 31, respectively, and are portions of brackets 92 and 93 which are secured to the forward edges of the stop plates 86 and 87, respectively.

Interposed between the forked lower portions 76 and 77, of the rods 78 and 79 and their guiding brackets 82 and 83 are compression springs 94 and 95 which urge the rods 78 and 79 downwardly so that the beveled upper ends of the connected lifter rods 85 are retained in a retracted position until lifted under the influence of the cam 63 upon the rocking arm 61. The upper portions of each of the holdback plates 86, 87 are provided with lift adjusting members 96, 97, respectively, which extend relatively closely above the top edges of the plates P as they are fed forwardly along that portion of the members 30 and 31 provided with the holdback plates. The forward edges of the members 96, 97 are adjustable towards and away from the stop members 88 and 89 so that only a single twin plate can be lifted therepast by the rods 85, the members 96 and 97 preventing the lifting of the remaining plates by engaging the upper edges thereof. Hence, but a single twin plate at a time is fed forwardly upon the extension bars 90 and 91. As will be seen from Fig. 4, the members 96 and 97 are substantially L-shaped, and have the longer legs thereof slidably guided by the upper portion of the holdback plates 86 and 87, respectively. The shorter or substantially vertical legs of these members each has an adjusting screw 98, 99, respectively, rotatably mounted therein and held against longitudinal displacement with respect thereto, these screws having threaded engagement respectively with threaded lugs 100 and 101 provided upon the upper surfaces of the holdback plates 86 and 87.

The extension bars or members 90 and 91 extend parallel with, and in a slight overlapping relationship to, the sides of a polygonally shaped drum 102 which is rotatably supported between the vertical side frame or panel members 103 and 104 of the machine by means of a shaft 105. This drum constitutes the means for supporting and firmly holding the twin plates P while being carried past the lug cutters, the lug cleaning means and the break-out wheel which operate upon the battery plates. The drum here shown is octagonal in configuration and is hollow, being formed from flat metal plates suitably secured together. The drum is provided with hub portions 106 and 107 which are keyed to the shaft 105 for rotation therewith and each face 108, about the polygonal periphery of the drum, is provided with a plurality of rockable fingers for gripping and holding battery plates firmly to the surface of the faces during the operations performed upon the plates. As most clearly shown in Figs. 2, 4, 5 and 6, these fingers are arranged in two groups adjacent the axially extending edges of the faces 108 of the drum, the fingers of each group having angularly extending portions directed towards each other. Thus, a plurality, in the present instance four, of fingers 109 are arranged adjacent one axially extending edge of each face 108, while a corresponding number of oppositely directed fingers 110 are disposed in axially spaced arrangement adjacent the other transversely extending edge of each face. Each of the faces 108 is provided with corresponding sets of these inwardly directed fingers 109 and 110, and since these sets of fingers are the same and are operated in the same manner for all of the faces only one set thereof will be described in detail.

The fingers 109 for each face of the drum are mounted to rock with a shaft 111, the ends of which are rotatably supported in suitable journals 112 and 113 secured to the sides 114 and 115 of the drum. The fingers 109 project through slotted openings in the face 108 of the drum and are substantially hook-shaped so that when said fingers are fully extended they will firmly grip the edge of a battery plate and hold the latter against the face 108 of the drum. Also secured to the shaft 111 to rock therewith is a short arm 116 disposed within the drum, the outer end of which arm is bifurcated. Received within the bifurcated end of the arm 116 is one end of a connecting link 117 which is pivotally connected to the arm 116 by a connecting pin 118. The other end of the link 117 is pivotally connected to the outer end of a short arm 119, the inner end of which is pinned to a transversely extending shaft 120. Also mounted upon the shaft 120 is a spring anchor 121 to which is connected one end of a tension spring 122, the other end of the spring 122 being connected with the pin 118 provided in the arm 116.

The shaft 120 extends beyond the side 115 of the drum, and the outer end of this shaft is provided with a crank arm 123. The outer end of this crank arm 123 is provided with a roller or cam follower 124 which is adapted to ride over the curved surface of a stationary cam 125. It will be observed that the construction is such that the action of the springs 122 is to rock the fingers 109 in a direction such that they are fully extended through the slots in the faces 108 of the drum, in other words are in a position to grip a battery plate. This action of the springs 122 also causes the arms 123 to be rocked to a position such that the rollers or cam followers 124 are extended into the path of the stationary cam 125 which is connected to the sidewall 103 of the frame for the machine. Hence, as the drum is rotated, in the direction indicated by the arrow R in Fig. 5, the rollers 124 sequentially engage this cam 125, thus rocking the corresponding arms 123 inwardly which in turn forces the links 117 outwardly against the action of the springs 122. This rocks the fingers 109 with respect to the surface of the faces of the drum so that battery plates may be released therefrom or placed in engagement therewith.

The fingers 110 for each face 108 of the drum are mounted upon a transversely extending shaft 126, being connected with the shaft to rock therewith. The ends of these shafts 126 are rotatably mounted in suitable journals carried by the end walls 114, 115 of the drum in the same manner as are the shafts 111. Likewise, the shafts 126 are each provided with a radially extending arm 127, the outer end of which is bifurcated to straddle the outer end of a connecting link 128, the link being connected with the arm 127 by a pin 129 which also secures the lower end of a tension spring 130 thereto. The inner end of each link 128 is pivotally connected to the outer end of a radially extending arm 131 which is secured to a transversely extending shaft 132. Each shaft 132 is also provided with a spring anchor 133 to which is secured the inner end of the compression spring 130.

The shafts 132 each extend through the end wall 114 of the drum, and the outer extending ends of these shafts are each provided with crank arms 134 having cam followers or rollers 135 mounted thereon and adapted to cooperate with a stationary cam 136 which is fastened to the sidewall or panel frame member 104 of the machine and extends in spaced parallel relationship with respect thereto. The action of the rollers 135, cranks 134, shafts 132, links 128, and springs 130 is the same as previously explained for the corresponding rollers, cranks, links, and springs associated with the fingers 109. That is to say, the springs 130 normally urge the fingers 110 to a position for gripping the edge of a battery plate to the face 108 of the drum. As the drum rotates, however, the rollers 135 engage the stationary cam 136, thereby actuating the fingers to plate releasing position, that is, moves them with respect to the surface of the face of the drum so that a plate held thereby may be released and a new plate gripped.

It will be observed that the arms 119 extend in substantially diametrically opposite directions from their companion crank arms 123 and likewise the arms 131 and the companion crank arms 134 extend in substantially diametrically opposite directions from each other. Moreover, the arms 119 and 131 extend in opposite directions from each other so that the crank arms 123 and 134 are oppositely disposed. Therefore, the stationary cam 125 is mounted approximately 90 degrees in advance of the stationary cam 136 so that the fingers 109 and 110 for any given face 108 are actuated substantially simultaneously. It will also be observed that small transversely extending stop strips or plates 137 and 138 are secured to the faces 108 of the drum adjacent the trailing edges thereof, the direction of rotation of the drum being indicated by the arrow R in Fig. 5. There are two such stop strips or plates for each face of the drum located between the outer pairs of fingers 110 thereon.

The construction is such that, as the battery plates are fed one at a time by means of the feeding mechanism just described, each of the plates so fed will move under the influence of gravity into contact with a separate face 108 of the rotating drum, being guided in this movement by the extensions 90, 91 of the feeding mechanism. The lower edge of each of the twin plates P thus fed will come to rest upon the upper edge of the stop plates or strips 137, 138 of a face of the drum, the cams 125 and 126 having meanwhile operated the fingers 109 and 110 of that face of the drum to retract the fingers to the positions shown for the vertical face 108 on the right hand side of Fig. 5. The rotation of the drum and the operation of the feeding mechanism is so timed that a double plate is fed from the latter to the former in exact synchronism as just described. Due to the momentum of the double plate and the positioning of the parts of the mechanism, a double battery plate so fed will tend to fall against the face 108 of the drum.

As the drum continues to rotate, the double plate, thus supported, passes under a roller 139 which is rotatably supported at the outer end of a bent arm 140, the other end of which is rotatably mounted upon a transversely extending shaft 141 (see Fig. 4). This roller 139 serves to insure that the battery plates are in firm engagement with the face 108 of the drum, and the continued rotation of the drum causes the fingers 109 and 110 to move outwardly to the plate gripping positions as the rollers 124 and 135 pass beyond the corresponding cams 125 and 136. The double plate is thus firmly gripped by the fingers 109 and 110 upon a rigid, smooth surface and is so retained throughout the succeeding operations performed upon the double plate by the mechanism about to be described. After these subsequent operations have been completed, the further rotation of the drum again brings the rollers 124 and 135 into engagement with their corresponding cams 125 and 136 to sequentially release the separated battery plates as hereinafter described.

Figure 1:
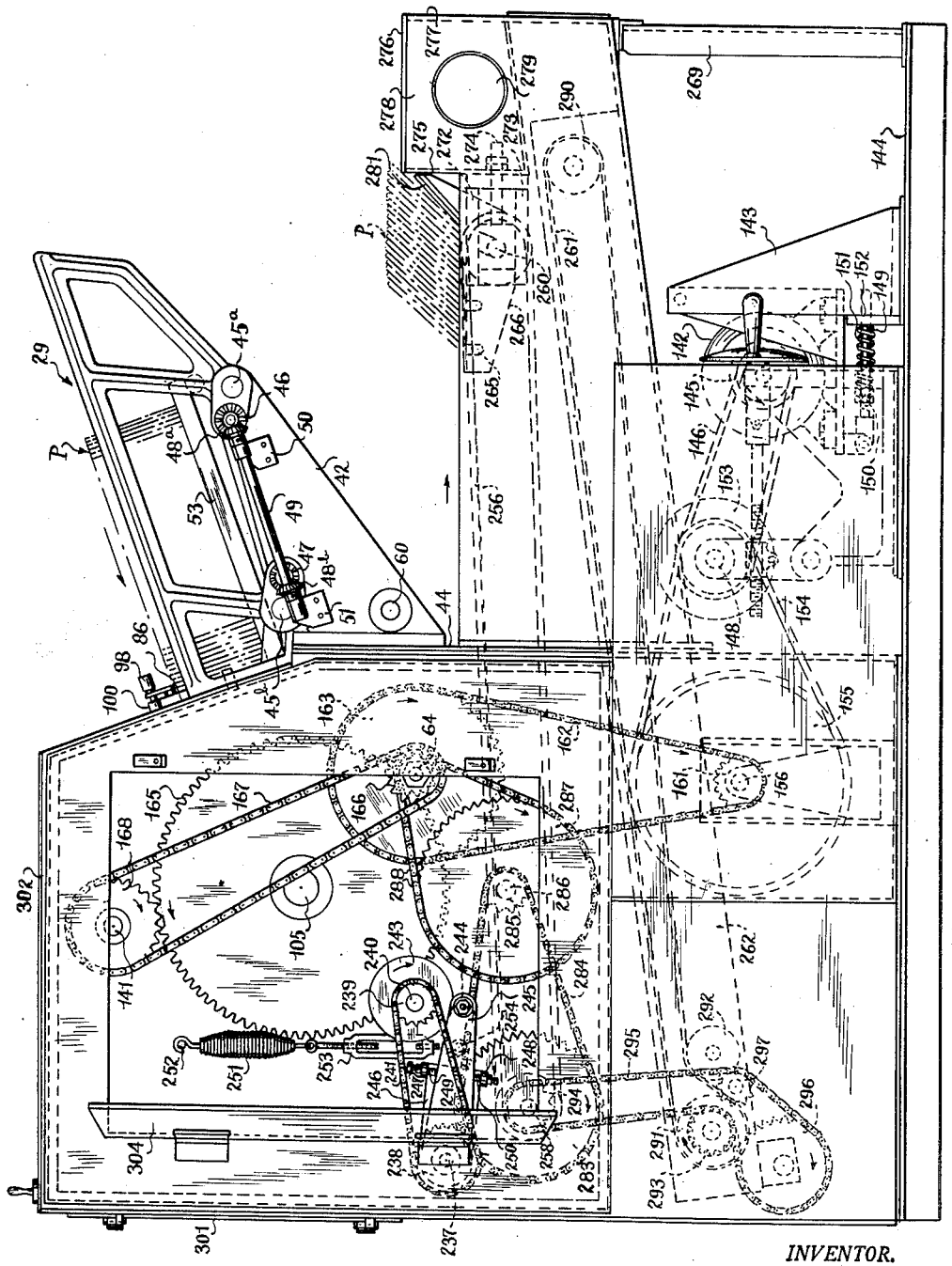
Fig. 1 is a side elevational view of a machine constructed in accordance with this invention, the door of the cover for a portion of the driving mechanism being illustrated in open position to more clearly show the relationship of certain of the parts.
Figure 2:
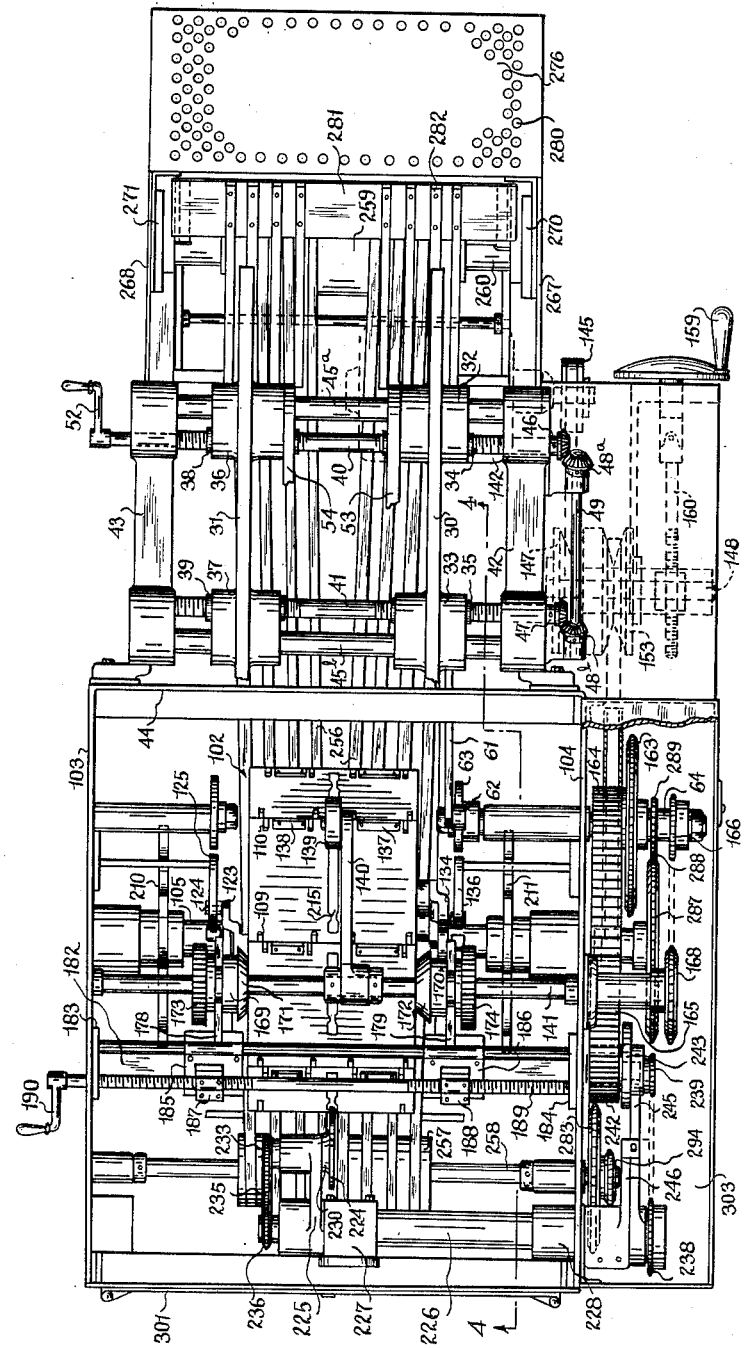
Fig. 2 is a top plan view of the machine illustrated in Fig. 1, the top cover plate thereof being removed and portions of the feeding mechanism and the cover for the driving mechanism being broken away to more clearly show the construction.
Figure 3:
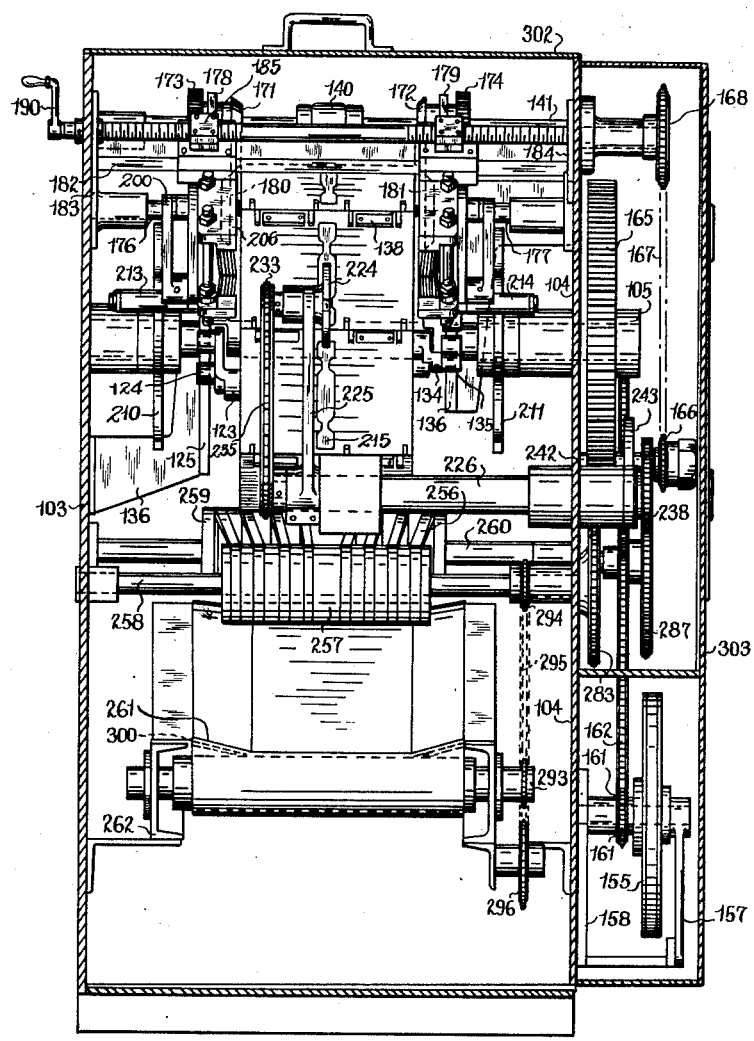
Fig. 3 is a rear end view of the machine illustrated in Figs. 1 and 2 with the end housing or cover plates removed to more clearly show the construction.

Referring now to Figures 1, 2 and 3 of the drawings, it will be seen that the machine is operated by a single electrical motor 142 which is pivotally supported by the two upstanding brackets 143 provided upon the base of the machine 144 in conventional manner. The output shaft of the motor 142 is provided with a pulley 145, about which is trained a belt 146 which also passes about a variable diameter pulley 147 mounted upon a shaft 148 and forming a part of a variable speed mechanism. The base of the motor has a rod 149 attached thereto which is provided with adjusting nuts 150 and a coil spring 151, the latter extending between the nuts 150 and a stationary plate 152 attached to the brackets 143. This enables the tension upon the belt 146 to be adjusted, as is well understood in the art. The shaft 148 is also provided with a variable diameter pulley 153 about which is trained a belt 154 which also passes about a relatively large diameter pulley 155 provided upon a shaft 156, the latter being supported between spaced uprights 157, 158 attached to the side plate or frame member 104 of the machine (see Fig. 3). A crank 159 attached to a threaded rod 160 cooperates with the pulleys 147 and 153 in a well-known manner to vary the diameter of the latter and thereby change the speed of rotation of the pulley 155. Since this variable speed mechanism is well known in the art, it need not be described in further detail.

The shaft 156 is further provided with a sprocket wheel 161 about which is trained a chain 162. The chain 162 also passes about a large diameter sprocket wheel 163 provided upon the shaft 64 which is journaled in a bearing mounted on the side or frame plate 104, the shaft 64 extending inwardly of the frame plate 104 and carrying the cam 63 on the inner end thereof. The shaft 64 is also provided, adjacent the outer face of the frame or supporting plate 104, with a small diameter spur gear 164 which is in mesh with a large diameter spur gear 165 keyed or otherwise connected to the shaft 105 for the drum. The gear ratios are so chosen that the shaft 64 makes eight revolutions to one revolution of the shaft 105 so that a plate P is fed into engagement with each face 108 of the drum 102 as the latter rotates past the feeding mechanism.

The shaft 64 also has a sprocket wheel 166 connected thereon and provided with a chain 167 which is trained about a sprocket wheel 168 connected with the shaft 141 to rotate the latter. Slidably keyed to the shaft 141, adjacent the sides of the drum 102, are hubs 169 and 170. To the inner face of each of the hubs 169 and 170 is connected a lug cutter disk 171 and 172, respectively. These disks are frusto-conical in shape, with their bases facing and parallel with the sides 103, 104 of the machine. The other face of each of the hubs 169 and 170 is provided with spur gears 173 and 174 which mesh, respectively, with corresponding spur gears such as 175 rotatably mounted on stub shafts 176 and 177, respectively. These stub shafts 176 and 177 are mounted upon the vertical frame or side plate members 103, 104, respectively, and the inner ends of the shafts 176, 177 terminate adjacent the corresponding sides of the polygonal drum 102.

The gears 175 are each connected with an end face of hub members similar to 169 and 170, these hub members being rotatably mounted upon the shafts 176 and 177. The latter hub members and the gears 175 are held in alignment with the hub members and gears upon the shaft 141 by bracket members 178 and 179 the ends of each of which have semi-circular openings received within grooves intermediate the ends of the hubs 169, 170, respectively, and corresponding grooves in the hub members carried by the shafts 176, 177. The inner faces of the hub members upon the shafts 176, 177 are provided with frusto-conically shaped lug cutters 180 and 181 which have their bases disposed towards the end faces of the drum 102. The base edges adjacent the cutters 171, 180 are in alignment and the base edges on the cutters 172, 181 are likewise in alignment. The base edges of these cutters form relatively sharp cutting edges and the cutters are so positioned relative to the drum that their meeting point is at the proper elevation for the lugs of the battery plate to pass therebetween as the drum 102 is rotated. Hence, the undesired portions of the lugs are cleanly severed by these cutters. The lug cutter disks are adjustable towards and away from the drum for the purpose of accommodating plates of different sizes, or to regulate the amount severed from the lugs, by mechanism about to be described.

Adjacent the shafts 141, 176, and 177 and extending parallel therewith is a rectangularly shaped bar 182, the sides of which are inclined to the horizontal. The ends of this bar are securely attached, as by welding or the like, to end plates 183 and 184 which are in turn mounted upon the vertical side plates or panels 103, 104 of the machine. The bar 182 extends with a sliding fit through correspondingly shaped openings provided in the brackets 178 and 179, one-half of the opening in each of the bracket members 178, 179 being provided upon inclined projections of the brackets; the other half of each opening being provided in cap members 185, 186 attached to the said projections upon the bracket members (see Fig. 4). Each of the cap members 185, 186 has attached thereto a divided nut 187, 188, respectively, cooperating with right- and left-hand threaded portions upon an adjusting shaft 189, the outer end of which is provided with a crank 190. The construction is such that when the crank 190 is turned the nuts 187, 188 are moved along the shaft 189 corresponding amounts in opposite directions, and since these are connected with the brackets 178, 179 both sets of cutters and spur gears are simultaneously adjusted relative to the drum 102.

By virtue of the fact that the cutters 171, 172 and the gears 173, 174 are connected with the hubs 178 and 179 which are keyed to the shaft 141, and since the shaft 141 is driven by means of the sprocket wheel 168 and chain 167, the cutters 171 and 172 are continuously rotated throughout the operation of the machine. Moreover, the cutters 180 and 181 are rotated in synchronism with the cutters 171 and 172 by the intermeshing of the gears 173 and 174 with the gears 175.

Figures 8, 9:
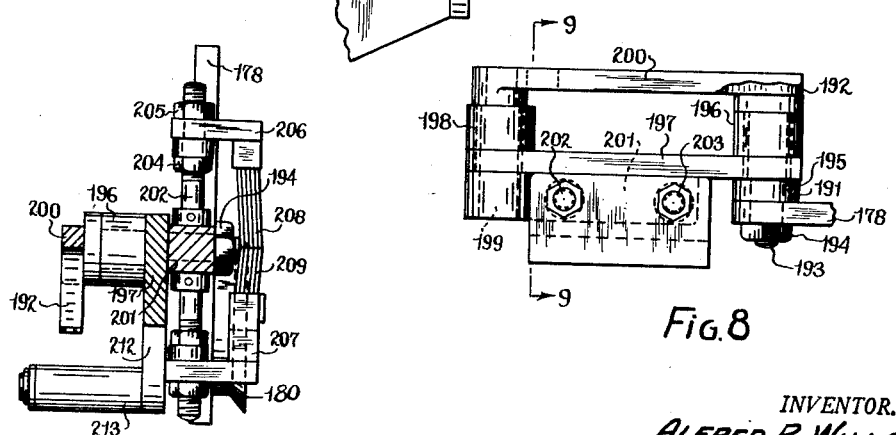
Fig. 8 is a fragmentary top plan view of one of the lug cleaning mechanisms illustrated in Figs. 4 and 7.
Fig. 9 is a sectional view of the lug cleaning mechanism, the view being taken substantially on the section indicating line 9—9 of Fig. 8.

The brackets 178 and 179 are each further provided with aligned bores below the connection for the bar 182. These bores are each surrounded by bosses such as 191 (see Fig. 8) welded to, or formed integral, with the brackets and forming the journals for the lug cleaning means assemblies. These assemblies are identical and hence only one will be described in detail. As shown in Fig. 4, a cam 192 having an arcuate surface of relatively great curvature has one face thereof, adjacent its inner end, welded or otherwise secured to a stud 193 which extends through the boss 191, the inner end of the stud being threaded and provided with a suitable nut 194. This stud and hence the cam 192 are held from rotation relative to the bushing 191 by means of a pin, setscrew, or the like 195. Intermediate the cam 192 and the bushing 191, the stud 193 passes through a bore in a boss 196 provided at one end of a swing arm 197 forming a part of the support for cleaning brushes which are adapted to engage the lugs of the battery plates after they have been cut to the correct length to clean the lugs of paste or other deposits that may be clinging thereto.

The end of the arm 197, opposite to that through which the stud 193 passes, is provided with a transversely extending bore and a large surrounding boss 198 which rotatably receives a short stub shaft 199. The outer end of the shaft 199 has an elongated, rectangularly shaped arm 200 extending radially therefrom and connected thereto for rotation therewith. This arm 200 extends above and rests upon the curved upper surface of the cam 192. The other end of the shaft 199 carries a radially extending arm 201 which is provided with a pair of spaced bores which extend in a direction at right angles to the shaft 199. The arm 201 is keyed or otherwise connected with the stub shaft 199 to rotate therewith and with the arm 200. Through the last-mentioned bores in the arm 201 extend brush mounting and adjusting screws 202, 203 which are provided with nuts such as 204, 205 for adjustably positioning brush holders 206 and 207. The brush holders 206 and 207 are provided with stiff bristles 208, 209 extending towards each other at somewhat of an angle and with the inner ends meeting in a plane which is adapted to be maintained substantially parallel with a face of the polygonal drum as the latter is rotated therepast. This is essential to prevent twisting and breaking of the lugs as they pass through the brushes during the rotation of the drum, since it will be rememberd that the angle which the face of the drum makes with a given transverse plane of the machine changes during the rotation of the drum. The bracket 178 is provided with a similar cam and brush assembly.

In order to impart to the brushes a movement such as to cause their meeting plane to remain substantially parallel with a face of the drum during rotation of the latter, the drum shaft 105 is provided, adjacent either side of the drum, with star-shaped cam members 210, 211. For convenience in assembly, these cams are shown as formed from metal plates in two halves or portions with an enlarged rectangular journal portion welded thereto, the two portions being bolted together as is clearly shown in Fig. 4. The swing arms 197, which are rockably supported upon the brackets 178, 179 by studs such as 193, each have a downwardly extending integral portion 212 which, respectively, rotatably supports cam rollers 213 and 214 for cooperation with the adjacent star wheels 210 and 211.

The construction just described is such that, with the shaft 105 rotating in a counterclockwise direction as viewed in Fig. 4, the star-shaped cam wheels 210, 211 will cause the swinging arm portions such as 197 to rock about the studs 193, thus elevating the brush assemblies from their lowermost position as indicated by the dotted position of the cam roller 214 in Fig. 4, to a position in which the plane of the meeting line of the brush bristles 208, 209 is parallel with the adjacent face of the drum which is just approaching the brushes. As the drum continues to rotate and the angle which this face of the drum makes with stationary parts of the machine varies, the angle of the plane of meeting of the brush bristles is correspondingly altered by the joint action of the star-shaped cam wheels 210 and 211 and the arcuately shaped cams 192. That is to say, the path of motion of the brushes is jointly determined by the cam wheels 210, 211 and by the arcuate cams 192, it being remembered that the latter are non-rotatably supported upon the brackets 178, 179 and cooperate with the arms 200 which are, in turn, connected to rock the stub shaft such as 199 and the arms such as 201 to which the brush holders are connected. The motion will be seen to comprise a rocking of the brush assemblies as a whole about the studs 193 by means of the star wheels, the angle of the brush bristles being controlled by the rocking of the brushes about the shafts 199 as controlled by the shape of the cams 192 cooperating with the arms 200. By virtue of this construction the plane of meeting of the brush bristles is maintained substantially parallel with each face of the drum as it is rotated past the brushes so that the lugs on the battery plates carried thereby may pass through the brushes without twisting or distortion.

Since the brush assemblies are supported upon the brackets 178 and 179, as just described, operation of the crank 190 not only effects adjustments of the lug cutters but also adjusts the width between the two brush assemblies, keeping each brush assembly and lug cutter set in proper alignment for any adjusted position.

Figure 12:
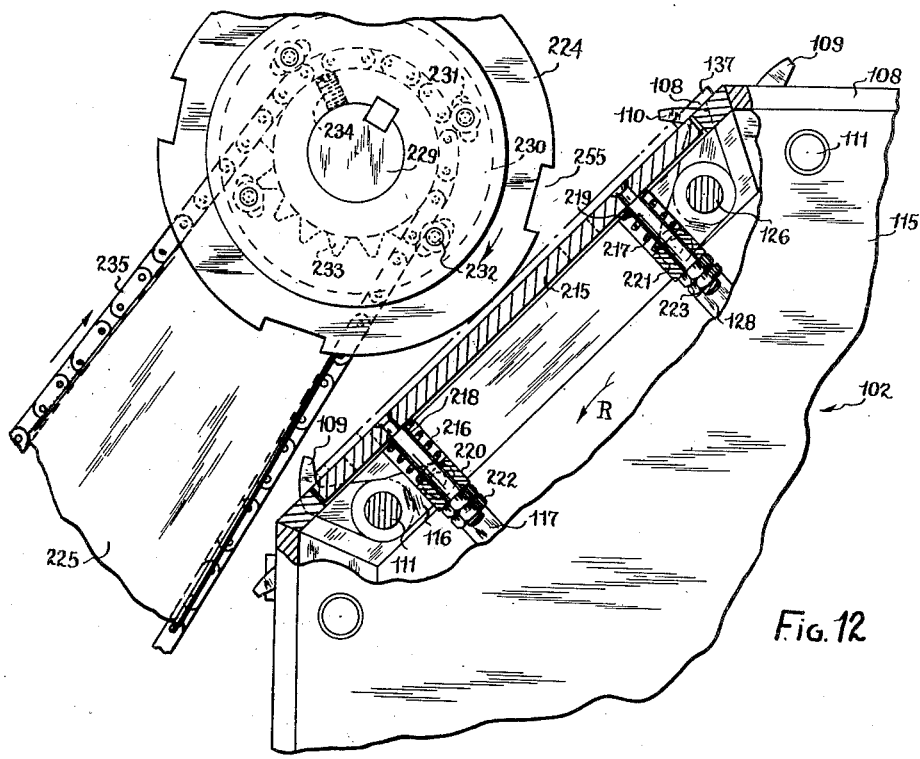
Fig. 12 is a fragmentary view on an enlarged scale, partly in section and partly in elevation, illustrating the novel breakout wheel and the cooperating depressible portion in an adjacent face of the polygonally shaped drum of the machine.

As previously mentioned, the battery plates P which are introduced into the machine are in the nature of twin or double plates which are to be separated by the machine, this being effected by breaking out the central joining strip 22 which unites the two individual plates 20 and 21 of each twin (see Fig. 13). In order that this may be effected without damage to the adjacent borders of the individual plates, or injury to the stub feet such as 23, 24, 25, 26 upon the adjacent edges of the individual plates, each face of the drum 102 is provided with a depressible strip portion 215 having a shape substantially similar to that of the portion 22 to be removed (see Figs. 3, 6, 7 and 12). Movable strip portion 215 has spaced laterally extending recesses which lie under the spaced portions of the battery plates and in which extend rigid portions of the drum face. These depressible portions extend substantially medially of the faces of the drum so as to be substantially aligned with the portions 22 of the plates when the latter have been fed into engagement with the drum and firmly gripped thereon as previously described. As will be seen in Figs. 6 and 12, each of these depressible portions 215 is normally maintained in the plane of the corresponding face of the drum by means of compression springs 216 and 217 which surround depending studs 218 and 219 connected with the portion 215 and extending towards the center of the drum, the inner ends of these studs passing through bores in the bight portions of U-shaped brackets 220 and 221, respectively, with the springs 216 and 217 being disposed between the depressible portion 215 and the brackets. The studs 218, 219 have a sliding fit in the brackets 220, 221 and the inner ends of these studs are provided with nuts 222 and 223 by which the position of the depressible portions 215 relative to the surface of the face 108 may be adjusted to render these parts coplanar.

As the plates are carried by the drum through the machine, while supported by the fingers 109, 110 and with the central portion 22 of the plates in alignment with the depressible portions 215, the plates first have their lugs trimmed and cleaned as just described and then pass beneath a breakout wheel 224 of novel construction and operation. This wheel exerts a predetermined adjustable pressure upon the central portion 22 of each double plate, breaking the latter free from the adjacent individual plates 20 and 21 by depressing the portion 215 thereunder, the plates being firmly held at this time so that they cannot slip or otherwise move which would cause improper breaking out of the portion 22 with consequent injury to the plates.

In order to effect this operation, the breakout wheel 224 is rotatably supported at the outer end of a rocking arm 225, the inner end of the latter being keyed to a sleeve 226 (see Fig. 2) which is journalled in bearings 227 and 228 carried by the frame of the machine. The outer end of the arm 225 provides a journal for a short shaft 229 to which is keyed a hub member 230 provided with arcuate slots 231. The breakout wheel 224 is provided with threaded holes, spaced in accordance with the spacing of the slots 231 of the hub member 230, the wheel being adjustably connected to the hub member by screws 232 which pass through the slots 231 and are threaded into the holes in the wheel 224. As will be readily understood, loosening of the screws 232 will enable the breakout wheel 224 to be adjusted circumferentially with respect to the hub 230.

The shaft 229 is also provided with a sprocket wheel 233 which is secured to the shaft by means of a setscrew, or the like, 234 so that the sprocket 233, shaft 229, hub 230, and breakout wheel 224 rotate together as a unit. The sprocket 233 is driven by means of a chain 235 which passes therearound and around a sprocket wheel 236 keyed or otherwise secured to a shaft 237 which is rotatably supported within the sleeve 226. The shaft 237 projects outwardly beyond the end of the sleeve 226 and beyond the wall or side panel 104 of the machine frame, this projecting outer end of the shaft being provided with a sprocket wheel 238 which is driven by a sprocket wheel 239, keyed to a shaft 240, through the medium of a chain 241 (see Figs. 1 and 2). The shaft 240 also has secured thereto a spur gear 242 of relatively small diameter which is in continuous mesh with the gear 165 and is therefore driven in predetermined time relationship with the rotation of the drum 102. Consequently, the breakout wheel 224 is also rotated in timed relationship with the rotation of the drum.

The shaft 240 is provided, intermediate the sprocket 239 and the gear 242, with a cam 243 which is connected to the shaft 240 to rotate therewith. This cam cooperates with a cam roller or follower 244 which is journalled on the outer end of a radially extending arm 245, the inner end of the latter being journalled upon the sleeve 226. Clamped or otherwise secured to the sleeve 226 adjacent the arm 245 is a shorter arm 246, the outer end of which is provided with spaced inwardly directed flanges or ears 247 and 248 which overlie the sides of the arm 245 in spaced relationship thereto. The flange or ear 247 is provided with an adjusting screw 249 and the flange or ear 248 is provided with an adjusting screw 250, these screws being threaded through the flanges or ears with their inner ends in contact with the edges of the arm 245, the screws being retained in adjusted position by means of suitable nuts. The arm 245 is therefore connected to rock the sleeve 226 through the medium of the arm 246, the angular relationship of the arms 245, 246 being adjustable by means of the screws 249 and 250. Hence, as the shaft 240 is rotated, the cam 243 carried thereby causes the arms 245 and 246 to be rocked, thus rocking the shaft 226 and the breakout wheel arm 225, thereby moving the axis of the breakout wheel towards and away from the axis of the drum 102 on which the battery plates are carried. The arm 245 is urged into continuous engagement with the cam 243 by means of a tension spring 251 which is connected between a fixed stud or pin 252, mounted in the wall or side panel 104, and one end of an adjusting turnbuckle 253, the other end of the latter being connected to a projecting pin or stud 254 on the arm 245.

The shape of the cam 243 and its speed of rotation are such that the arm 225 is rocked in a manner to cause the axis of the breakout wheel to remain substantially parallel with the adjacent face of the drum 102 while the latter is rotated therepast so that the wheel 224 exerts a substantially constant, uniform pressure upon the central portion 22 of each of the double battery plates P. Hence, these portions 22, which are supported upon the depressible strips or portions 215 of the drum faces, are sequentially broken free from the adjacent individual plates 20 and 21 as a result of the pressure of the rotating wheel 224 moving thereover. It will be observed that the periphery of the breakout wheel 224 is provided with circumferentially spaced notches or recesses 255. The spacing of these notches or recesses is such, and the speed of rotation of the wheel is such, that one of the said notches or recesses is adjacent a face 108 of the drum 102 at the time when each pair of stub feet such as 23, 25 or 24, 26 of the battery plates is passing under the breakout wheel. These notches or recesses 255 straddle the said feet of the battery plates in order that they may not be injured or damaged by the breakout wheel, the width of which is substantially equal to the width of the main portion of the center section 22 of the plates to insure a clean separation of this portion from the individual plates 20 and 21. Adjustment to insure that the notches 255 will exactly straddle the feet of the plates is effected by means of the previously described screws 232 which enable the breakout wheel 224 to be circumferentially adjusted relative to its hub and sprocket 230 and 233. The pressure exerted by the breakout wheel upon the central connecting portion of the double battery plates is adjusted by means of the screws 249 and 250 which change the angular relationship between the arms 245 and 246, thereby altering the extent of rocking imparted to the arm 245 by means of the cam 243.

After the drum 102 has rotated past the breakout wheel, the fingers 109 and 110 hold the two separated plates, corresponding to the portions 20 and 21 of the twin plate P, firmly in position while the drum continues a portion of its further rotation. Also, the severed portion 22 remains in position between the two separated plates 20, 21 but is now severed therefrom. The plates are so held until the stationary cams 125 and 136 operate the corresponding crank arms 123 and 134 to release the corresponding fingers 109 and 110, which occurs when the plates have reached substantially their lowermost position while being carried by the drum. The plates then fall by gravity upon a multiple belt conveyor 256, the individual belts of which are horizontally spaced from each other and extend from a grooved pulley or drum 257 (see Fig. 2) mounted upon a shaft 258 adjacent the rear of the machine, to a grooved drum 259 connected with a shaft 260, mounted adjacent the forward portion of the machine. It will be observed that the grooves in the drums 257 and 259 are arranged in two spaced groups and the two groups of grooves of drum 259 are spaced slightly further apart than the groups of grooves in the drum 257 so that the separate belts of the belt conveyor form two groups which diverge. Hence, the two severed plates 20 and 21 of the original twin battery plates are moved away from each other, as they are carried by the conveyor 256, thereby facilitating their removal from the machine in individual piles, and the scrap, resulting from operation of the breakout wheel and the lug cutter disks, can freely fall through the conveyor onto a scrap conveying belt 261. This latter belt is mounted below the conveyor 256, in a manner hereinafter described, between inclined side plates 262 which are suitably secured to the side frame members of the machine.

In order to support the upper flights of the individual belts in the conveyor 256 and prevent their deflection under the weight of the battery plates, spaced guide rails 263 (see Fig. 4) are provided thereunder. These rails are supported from the side members of the machine adjacent the rear of the conveyor 256 by a transversely extending rod or shaft 264, the forward ends of these supporting plates being mounted upon transversely extending rods 265 and 266 (see Fig. 1) which are mounted between longitudinally extending side members or panels 267 and 268. The members or panels 267 and 268 provide a forward extension on the machine below the feeding mechanism 29, the forward portion of which extension is supported from the base of the machine 144 by suitable vertical standards or posts 269. The shaft 260 for the conveyor 256 is adjustably supported in this forward extension of the housing of the machine by bracket members 270, 271 each of which have a slotted opening in the top thereof for receiving the shaft 260, these bracket members being slidably supported in horizontal guideways such as 272, 273. The bracket members 270 and 271 are adjusted, and held in adjusted position, by means of a threaded stud or rod 274 extending rearwardly from each bracket and through a vertical plate 275 welded or otherwise secured transversely between the panels 267 and 268.

The plate 275 forms a part of a support for a handling platform or deck 276 at the outer end of the extension provided by the side members 267 and 268. This deck 276 is further supported by vertically extending plate 277 and by side plates such as 278, the latter plates preferably being integral portions of the side members or panels 267 and 268. At least one of the side plates 278 is provided with an enlarged opening 279 for cleanout purposes, since the deck or platform 276 is provided with a plurality of holes 280 through which dust and small particles of scrap may freely flow. Preferably the opening 279 is connected with a source of reduced air pressure, thus creating a partial vacuum within the enclosure below the plate 276 so as to positively draw the dust and particles therein.

Adjacent the plate 275 there is provided an angularly extending supporting member 281 which extends upwardly from the conveyor 256 and has downwardly extending fingers or portions 282 connected thereto and extending between the individual belts of the conveyor. Hence, as the separated plates 20 and 21 are carried along by the conveyor 256, the said plates will tend to pile up in two distinct groups similar to the broken line indication shown in Fig. 1. The plates may then be readily transferred by the operator onto the deck 276 where they may be straightened and carefully aligned with each other and then removed for subsequent operations.

The conveyor 256 is driven by means of a sprocket wheel 283 connected to the outer end of the shaft 258 which extends through the vertical plate or support member 104, the sprocket 283 being attached to the shaft exteriorly of this plate. The sprocket 283 is connected by a chain 284 with a smaller diameter sprocket 285 connected with a stud shaft 286. The shaft 286 is journalled in a boss attached to the exterior surface of the plate 104, the said shaft 286 also being provided with a relatively large sprocket wheel 287. The sprocket wheel 287 is connected by a chain 288 with a relatively small diameter sprocket wheel 289 mounted upon the shaft 64 which, it will be remembered, is driven from the motor 142 through the variable speed mechanism, pulley 155, and sprockets 161, 163 and chain 162.

The scrap conveyor 261 is a suitable flexible belt which extends about rotatable drums 290 and 291, the slack of the belt being adjustable by means of an idler drum 292. The shaft for the drum 291 is provided with a sprocket wheel 293, while the shaft 258 for the conveyor 256 is provided with a sprocket wheel 294. A chain 295 passes about the sprocket wheel 294, sprocket wheel 293, a sprocket wheel 296, and a relatively small sprocket wheel 297, all of which are suitably supported by one of the supporting members 262 for the scrap conveyor (see Figs. 1 and 3). This driving connection is such that the sprocket wheels 296 and 297 act to take up the slack in the chain 295.

Extending from the rear supporting member or plate 298 of the apparatus is an inclined scrap deflector or guard 299 having slots adjacent its lower end for permitting passage of the individual belts of the conveyor 256. Suitable other scrap directing chutes and plates may be provided within the machine to carry the refuse to the scrap conveyor 261, and, if desired, an extension chute may be provided in alignment with the outer end of this scrap conveyor to carry the materials thereon exteriorly of the machine for disposal. In order to facilitate the carrying of the scrap upon the belt 261, its upper flight is supported by a metal plate 300 supported upon the members 262 and having the portion adjacent the edges thereof inclined upwardly to provide a somewhat trough configuration for the upper flight of the belt.

The rear supporting frame plate or member 298 is preferably provided with two vertically spaced openings for accommodating the removal of scrap from the conveyor 261 and to afford access to the upper portion of the apparatus. This upper opening may be closed by hinged doors such as 301 and the top of the machine is preferably closed by a removable cover plate 302. In addition, the gears, sprockets, and chains for driving the drum, breakout wheel, lug cutters, and feeding mechanism are enclosed in a substantially rectangular housing 303 provided with a hinged door 304, which is shown in open position in Fig. 1. The other gearing and driving mechanisms for the apparatus, as for example, the pulley 155 and associated sprocket 161, together with the variable speed mechanism, are likewise enclosed in suitable housings to prevent the entrance of scrap or dust therein. The several belts and chains employed for effecting driving of the various operating parts of the mechanism may be provided with conventional slack adjusting means such as sprockets or pulleys mounted on pivoted arms as is well known in the art, these slack adjusting means having been omitted for the sake of clarity of illustration.

In employing the improved apparatus, the operator first adjusts the spacing between the inclined members 30 and 31 of the feeding mechanism 29 to the proper width for the twin or double plates P to be handled, this adjustment being effected by operation of the crank 52. The screws 98 and 99 are then adjusted so that when the rods 85 are raised and lowered, only a single double plate at a time is fed over the stop lugs 88, 89 and 65. He next adjusts the distance between the lug cutting disks 171, 172 and 180, 181 by means of the crank 190, which also simultaneously adjusts the two pair of brushes since these are connected for movement with the lug cutting disks. The pressure exerted by the breakout wheel 224 is adjusted by means of the screws 249, 250, and the positions of the recesses in the periphery of the breakout wheel are adjusted relative to the depressible segments 215 on the drum by loosening the screws 232 and turning the wheel 224 until the notched portions 255 straddle the portions of reduced width in the depressible portions 215 when the drum and wheel 224 are rotated. The operator next sets the variable speed mechanism by means of the crank 159 to operate at a predetermined speed and places a quantity of the twin or double plates P to be separated in to the feeding hopper 29 with the lugs of the plates resting on the upper surfaces of the members 30 and 31 as indicated by the broken lines in Fig. 1. Next the motor 142 is started. This effects rotation of the cam 63, the drum 102, the star-shaped cams 210, 211, cam 243, breakout wheel 224, and also places in operation the conveyor 256 and the scrap conveyor 261.

Rotation of the cam 63 rocks the arm 61 and thereby causes the bars 53 and 54 to rock up and down, joggling the twin battery plates P so that the latter move towards the drum 102. The forwardmost twin plate within the feeding compartment 29 is stopped by the stop lug 65 engaging the bottom edge of the plate and by the upstanding lugs 88 and 89 which engage the outwardly extending portions 27, 28 of the lugs. Actuation of the lever 61 by cam 63 also causes the feeding rods 85 to reciprocate and sequentially engage the lugs of the forwardmost twin battery plate, lifting the latter sufficiently to pass beyond the stop lugs or members 65, 88 and 89. The plate thus lifted beyond the stop lugs moves by gravity into engagement with a face 108 on the rotating polygonal drum 102, being guided in this movement by the extension members 90 and 91, the operation of the feeding rods 85 being so timed that a plate is fed when a face 108 of the drum is in optimum position for receiving the plate.

As the twin battery plate P engages the face 108 of the drum 102, the lower edge thereof rests upon the cross members or strips 137, 138. At this time the fingers 109 and 110 on the face of the drum, receiving the battery plate, are retracted by means of the stationary cams 125 and 136. As the drum 102 continues to rotate, the fingers 109 and 110 are moved into gripping engagement with the edges thereof by the springs 122 and 130 after the finger actuating rollers have moved past the cams 125 and 136, the roller 139 acting to press the battery plate into firm engagement with the face of the drum. Hence, the twin plate is properly gripped on the face of the drum and without injury to the edges thereof. As each face of the drum moves past the feeding mechanism, the rods 85 of the latter feed a new twin plate into engagement with the face of the drum adjacent thereto in the manner just described.

Continued rotation of the drum, with the battery plates P supported and held thereon by means of the fingers 109 and 110, moves the lugs 27, 28 of the plates between the lug cutting disks 171, 180 and 172, 181. Since these disks are in continuous rotation, they quickly and cleanly sever the unwanted extremities of the lugs 27 and 28, the lugs then moving between the bristles of the brushes 208 and 209 which remove any paste or other foreign material which may have been deposited upon the lugs and which would interfere with the attachment of the lugs in a completed battery assembly, as by burning or the like operation. During this movement of the lugs between the brushes, it will be observed that the star-shaped cams 210 and 211, which are rotated at the same speed as the drum 102, sequentially rock the brush assemblies about the studs 193, and the brush holders are further rocked about the stub shafts 199 by the cooperation between the arms 200 and the curved stationary cams 192. Consequently the plane of meeting of the brushes is maintained at all times substantially parallel with the faces 108 of the drum as the latter are rotated therepast so that the lugs of the battery plates are not twisted during this cleaning operation.

The rotation of the drum 102 next carries the twin battery plates P under the breakout wheel 224, the supporting arm 225 of which is rocked by the cam 243 to maintain the axis of the breakout wheel substantially equidistant from the face of the drum 102 while the wheel is in engagement with a battery plate supported thereon. The wheel 224, being driven in timed relationship with the rotation of the drum, depresses and breaks out the central portion 22 joining the individual plates 20, 21 by virtue of the resilient mounting of the depressible portions 215 in the faces of the drum and which are in registry with the central or web portions 22 of the twin battery plates. The speed of rotation of the breakout wheel 224 is such that the cutout or recesses 255 thereon straddle the stub feet 23, 25, 24, 26 of the battery plates so that the central portion 22 may be broken out without injury to the said stub feet.

As the drum 102 continues to rotate, the fingers 109 and 110 are released from engagement with the plate by virtue of the rollers on the crank arms 123 and 134 engaging the stationary cams 125 and 136. The severed battery plates 20, 21 therefore drop upon the conveyor 256 and are carried thereby to the forward portion of the machine, being moved in somewhat divergent paths due to the angle between the two groups of belts comprising the conveyor 256. This allows the broken out portion 22, and the scrap from the severed lugs, to fall through the conveyor 256 upon the scrap conveyor belt 261 by which it is carried out of the machine at the rear thereof, that is, at the left as viewed in Fig. 1. The severed battery plates will collect in two distinct groups at the forward end of the machine, the plates tending to rise on end, as indicated by the broken lines in Fig. 1, by riding up the inclined plate 281. These severed plates are removed by the operator and aligned into stacks or piles upon the perforated deck plate 276, from whence the severed plates may be moved to other points of use. After the apparatus has been initially adjusted, it can remain in continuous operation without requiring any attention from the operator except the supplying of plates to be separated to the feeding compartment 29 and the removal of the severed plates from the conveyor 256.

While the present preferred embodiment of the invention has been described and illustrated in considerable detail, it will be readily understood that numerous modifications and adaptations thereof can be made by those skilled in the art without departing from the spirit of the invention. Therefore, the invention is not to be considered as limited to the exact details of construction herein illustrated and described, but only as required by the spirit and scope of the appended claims.

Having thus described my invention, I claim:

1. In an apparatus for operating upon storage battery plates united by an integral web, a frame, a polygonally shaped drum rotatably mounted on said frame, means for rotating said drum, plate holding means carried by said drum and movable relative to the latter for supporting and firmly holding connected battery plates on each face of the drum, means for breaking out the web joining the connected plates while the plates are supported and held on the drum and the latter is rotating, and means acting on the plate holding means subsequent to operation of said breaking means to move the plate holding means to plate releasing position.

2. The combination as defined in claim 1 and in which the plate holding means carried by said drum for supporting and holding connected battery plates on each face of the drum comprise a plurality of movable fingers for engaging edges of the plates, and resilient means for urging the said fingers to plate gripping position.

3. The combination as defined in claim 1 and in which the plate holding means carried by said drum for supporting and holding connected battery plates on each face of the drum comprise a plurality of movable fingers for engaging edges of the plates and resilient means for urging the said fingers to plate gripping position, and the said means for releasing the plate holding means comprising one or more stationary cams for actuating said fingers to plate releasing position during a predetermined portion of each rotation of the drum.

4. The combination as defined in claim 1 and in which each face of said drum is provided with a movable portion substantially corresponding to the location and shape of the web portion to be broken from the connected battery plates, the said movable portions moving inwardly of the planes of the faces of the drum under action of the means for breaking out the webs.

5. In an apparatus for operating upon storage battery plates united by an integral web, a frame, a polygonally shaped drum rotatably mounted on said frame and having unitary plate-like faces, means for rotating said drum, plate holding means carried by said drum and movable relative to the latter for supporting and firmly holding a unit of connected battery plates on each face of the drum, a rotatable disk adjacent the drum and engaging the webs joining the connected plates while the plates are supported and held on the drum and the latter is rotated to break out the said webs, and means acting on the plate holding means subsequent to engagement of said disk with the plate-joining web for moving the plate holding means to plate releasing position.

6. The combination defined in claim 5 and in which means are provided to cause the said rotatable disk to exert pressure upon said web, and further comprising means to adjust the pressure exerted by said disk.

7. The combination defined in claim 5 and further comprising means to cause the said rotatable disk to exert pressure upon the said webs of the connected battery plates, a resiliently mounted movable portion in each face of said drum substantially corresponding in location and shape with the web portion to be broken from the connected battery plates, the said movable portions moving inwardly of the planes of the faces of the drum under the pressure exerted by said disk thereby facilitating the breaking out of the webs.

8. In an apparatus for operating upon storage battery plates united by an integral web, a frame, a polygonally shaped drum rotatably mounted on said frame and having unitary plate-like faces, means for rotating said drum, plate holding means carried by said drum and movable relative to the latter for supporting and firmly holding a unit of connected battery plates on each face of the drum, a rotatable disk adjacent said drum and engaging the webs between the connected plates while the plates are supported and held on the drum and the latter is rotating to break out the said webs, means for rotating said disk in timed relationship with the rotation of said drum, and means acting on the plate holding means after the webs between connected plates have been broken out to move the said plate holding means to plate releasing position.

9. The combination as defined in claim 8 and in which the said rotatable disk is provided with one or more recesses in its periphery for straddling spaced portions of each battery plate adjacent the connecting web, whereby the said spaced portions are not broken off by the said disk and provide stub feet for the separated plates.

10. In an apparatus for operating upon storage battery plates united by an integral web, a frame, a polygonally shaped drum rotatably mounted on said frame, means for rotating said drum, plate holding means carried by said drum and movable relative to the latter for supporting and firmly holding a unit of connected battery plates on each face of the drum, a rotatable disk adjacent said drum and engaging the web joining the individual plates of a supported unit while the plates are supported and held on the drum and the latter is rotating to break out the said webs, means for moving the axis of said disk to maintain it at a substantially uniform distance from each face of said drum as the latter is rotated past said disk, and means acting on the plate holding means after the web of the unit held thereby has been broken out to move the said plate holding means to plate releasing position.

11. The combination defined in claim 10 and in which means are provided to adjust the distance between the axis of said disk and the faces of the drum to thereby adjust the pressure exerted by said disk upon the said connecting webs.

12. In an apparatus for operating upon storage battery plates united by an integral web, a frame, a polygonally shaped drum rotatably mounted on said frame and having plate-like faces, means for rotating said drum, plate holding means carried by said drum and movable relative thereto for supporting and firmly holding a unit of connected battery plates on each face of the drum, a rotatable disk adjacent said drum for engaging the web joining the individual plates of a supported unit while the drum is rotating to break out the said web, means for rotating said disk in timed relationship with the rotation of said drum, means for bodily moving said disk to maintain its axis at a substantially uniform distnce from each face of said drum as the latter is rotated past said disk, and means acting on the plate holding means after the web of the unit held thereby has been broken out to move the said plate holding means to plate releasing position.

13. The combination defined in claim 12 and in which each face of said drum is provided with a resiliently mounted movable portion corresponding to the location and shape of the web portion to be broken from each unit of connected battery plates, the said portions moving inwardly of the planes of said faces under the pressure exerted upon the web by said disk, and means to adjust the distance between the axis of said disk and the faces of the drum to thereby adjust the pressure exerted upon the webs by the disk.

14. The combination defined in claim 13 and in which the said rotatable disk is provided with one or more recesses in its periphery for straddling spaced portions of each battery plate adjacent the connecting web, and the said movable portions in the faces of the drum are provided with spaced laterally extending recesses lying under the said spaced portions of the battery plates which are straddled by the said disk with rigid portions of the said drum faces extending into said recesses to provide support for the said spaced portions of the plates thereabove, whereby the said spaced portions of the battery plates are not broken off by said disk and provide stub feet for the separated plates.

15. In an apparatus for operating upon storage battery plates united by an integral web, a frame, a polygonally shaped drum rotatably mounted on said frame, means for rotating said drum, means carried by said drum for supporting and firmly holding a unit of connected battery plates on each face of the drum, a rotatable disk adjacent the drum engaging the web joining the individual plates of a supported and held unit while the drum is rotating to break out said web, cam means operated in timed relationship with the rotation of said drum to bodily move said disk in a manner to maintain its axis at a substantially uniform distance from each face of said drum as the latter is rotated past said disk, and means for releasing the plate holding means after the web of the unit held thereby has been broken out.

16. An apparatus of the character described in claim 15 and further comprising means for adjusting the pressure exerted by said rotatable disk upon the said webs.

17. The combination as defined in claim 15 in which the said disk has one or more recesses in its periphery for straddling spaced portions of each battery plate adjacent its connecting web, and means are provided for rotating said disk in timed relationship with the rotation of said drum, whereby predetermined spaced portions of each battery plate adjacent the connecting web are not broken off by said disk and provide stub feet for the separated plates.

18. In an apparatus for operating upon pairs of storage battery plates united by an integral web and having lugs extending outwardly at opposite sides thereof, a frame, a polygonally shaped drum rotatably mounted on said frame, means for rotating said drum, plate holding means carried by said drum and movable relative thereto for supporting and firmly holding a pair of connected battery plates on each face of the drum, means adjacent said drum for cutting the lugs of a supported pair of plates to a predetermined length while the plates are supported and held on the drum and the latter is rotating, means sequentially cooperating with the faces of said drum for breaking out the web joining the two individual plates of a held and supported pair of plates while the drum is rotating, and means acting on the plate holding means after the pair of plates held thereby have been separated by breaking out the connecting web to move said plate holding means to plate releasing position.

19. In an apparatus for operating upon pairs of storage battery plates united by an integral web and having lugs extending outwardly at opposite sides thereof, a frame, a polygonally shaped drum rotatably mounted on said frame, means for rotating said drum, individually operable means carried by said drum adjacent each face thereof and movable relative thereto for supporting and firmly holding a pair of connected battery plates on each face of the drum, means adjacent the drum for cutting the lugs of a supported pair of plates to a predetermined length while the drum is rotating and the plates are held thereon, a rotatable disk cooperating with said drum faces while the drum is rotating for breaking out the web joining the two individual plates of a pair of plates supported and held on the drum after the lugs have been cut to a predetermined length, and means acting on each plate holding means after the pair of plates held thereby has been separated by breaking out the connecting web to move said plate holding means to plate releasing position.

20. The combination as defined in claim 19 and in which the means for cutting the lugs of the battery plates to a predetermined length comprise rotatable cutters mounted adjacent the sides of said drum in advance of the means for breaking out the webs connecting the individual plates.

21. The combination as defined in claim 20 and in which means are provided to simultaneously adjust the positions of said cutters relative to the sides of said drum.

22. The combination as defined in claim 21 and in which means are provided to rotate said cutters.

23. In an apparatus for operating upon pairs of storage battery plates united by an integral web and having lugs extending outwardly at opposite sides thereof, a frame, a polygonally shaped drum rotatably mounted on said frame, means for rotating said drum, individually operable means carried by said drum adjacent each face thereof and movable relative thereto for supporting and firmly holding a pair of battery plates on each face of the drum, means for cutting the lugs of a supported pair of plates to a predetermined length while the drum is rotating and the plates are held thereon, a rotatable disk cooperating with said drum faces for breaking out the web joining the two individual plates of a pair of plates while supported and held on the rotating drum and after the lugs have been cut to a predetermined length, means for rotating said disk in timed relationship with the rotation of said drum, and stationary means sequentially cooperating with each plate holding means to release the latter after the pair of plates held thereby has been separated by breaking out the connecting web.

24. In an apparatus for operating upon pairs of storage battery plates united by an integral web and having lugs extending outwardly at opposite sides thereof, a frame, a polygonally shaped drum rotatably mounted on said frame, means for rotating said drum, a plurality of movable fingers carried by said drum adjacent each face thereof for supporting and firmly holding a pair of battery plates on each face of the drum, means adjacent said drum for cutting the lugs of a supported pair of plates to a predetermined length while the drum is rotating and the plates are held thereon by said fingers, a rotatable disk sequentially cooperating with the faces of said drum for breaking out the web joining the two individual plates of a pair of supported and held plates while the drum is rotating and after the lugs have been cut to a predetermined length, means for moving the said disk bodily to maintain its axis at a substantially uniform distance from each face of said drum as the latter is rotated past said disk so that the said disk exerts a substantially uniform pressure on said webs, and means for sequentially releasing the said fingers holding each pair of plates after the individual plates have been separated by breaking out the connecting web.

25. In an apparatus for operating upon pairs of storage battery plates united by an integral web and having lugs extending outwardly at opposite sides thereof, a frame, a polygonally shaped drum rotatably mounted on said frame, means for rotating said drum, a plurality of movable fingers carried by said drum adjacent each face thereof, resilient means normally urging said fingers in a direction to effect supporting and firm holding of a pair of battery plates on each face of the drum, a pair of rotatable cutters supported by said frame adjacent the sides of the drum for cutting the lugs of a supported and held pair of plates to a predetermined length while the drum is rotating, a rotatable disk cooperating with said drum for breaking out the web joining the two individual plates of a pair of supported and held plates while the drum is rotating and after the lugs have been cut to a predetermined length, means for rotating said disk in timed relationship with the rotation of said drum, means for moving said disk bodily to maintain its axis at a substantially uniform distance from each face of said drum as the latter is rotated past said disk so that the said disk exerts a substantially uniform pressure on said webs, and stationary cam means sequentially operating the movable fingers of each face of said drum to plate releasing position after the pair of plates held thereby has been separated by breaking out the connecting web.

26. In an apparatus for operating upon pairs of storage battery plates having lugs extending outwardly at opposite sides thereof, a frame, a polygonally shaped drum rotatably mounted on said frame, means for rotating said drum, means carried by said drum for supporting and firmly holding a pair of battery plates on each face of the drum, means adjacent said drum for cleaning the lugs of a pair of supported plates while the drum is rotating, means for moving said cleaning means in timed relationship with the rotation of said drum in a path to maintain the cleaning surfaces of said cleaning means substantially parallel with each face of said drum as the latter is rotated past said cleaning means, and means for subsequently releasing the plate holding means.

27. The combination as defined in claim 26 and in which the said cleaning means are rockably mounted adjacent the sides of said drum and the means for moving said cleaning means comprise cam means driven in timed relationship with the rotation of said drum and cooperating with said cleaning means to effect rocking thereof.

28. The combination as defined in claim 26 and in which the said cleaning means comprise assemblies rockably mounted adjacent the sides of said drum, and the means for moving said cleaning means comprise rotatable cam means for rocking said assemblies in timed relationship with the rotation of said drum, and stationary cam means for rocking the cleaning surfaces of said cleaning means relative to their assemblies.

29. The combination as defined in claim 28 and in which means are provided for simultaneously adjusting the said assemblies relative to the sides of the drum.

30. The combination as defined in claim 29 and in which the cleaning surfaces of said cleaning means comprise pairs of cooperating brushes between which the lugs of the battery plates pass as the drum is rotated.

31. In an apparatus for operating upon pairs of storage battery plates united by an integral web and having lugs extending outwardly at opposite sides thereof, a frame, a polygonally shaped drum rotatably mounted on said frame, means for rotating said drum, plate holding means carried by said drum adjacent each face thereof and movable relative thereto for supporting and firmly holding a pair of battery plates thereon, means adjacent said drum for cleaning the lugs of a pair of supported and held plates while the drum is rotating, means cooperating with said drum for breaking out the web joining the two individual plates of a pair of supported and held plates while the drum is rotating and after the lugs have been cleaned, and means acting on the plate holding means for each face of the drum after the pair of plates held thereby has been separated by breaking out the connecting web to move said plate holding means to plate releasing position.

32. In an apparatus for operating upon pairs of storage battery plates united by an integral web and having lugs extending outwardly at opposite sides thereof, a frame, a polygonally shaped drum rotatably mounted on said frame, means for rotating said drum, plate holding means carried by said drum adjacent each face thereof and movable relative thereto for supporting and firmly holding a pair of battery plates thereon, means adjacent said drum for cleaning the lugs of a pair of supported and held plates while the drum is rotating, means for moving said cleaning means in timed relationship with the rotation of the drum to maintain the cleaning surfaces of said cleaning means substantially parallel with each face of said drum as the latter is rotated therepast, means cooperating with said drum for breaking out the web joining the two individual plates of a pair of supported and held plates while the drum is rotating and after the lugs have been cleaned, and means acting on the plate holding means for each face of the drum after the pair of plates held thereby has been separated by breaking out the connecting web to move said plate holding means to plate releasing position.

33. The combination as defined in claim 32 and in which the said cleaning means comprise pairs of cooperating brushes adjacent the sides of said drum.

34. The combination as defined in claim 32 and in which the lug cleaning means are positioned adjacent each side of said drum and means are provided to simultaneously adjust the said cleaning means relative to the sides of the drum.

35. The combination as defined in claim 32 and in which the said cleaning means are rockably mounted adjacent the sides of said drum and the means for moving said cleaning means comprise cam means for rocking said cleaning means in timed relationship with the rotation of said drum.

36. In an apparatus for operating upon pairs of storage battery plates united by an integral web and having lugs extending outwardly at opposite sides thereof, a frame, a polygonally shaped drum rotatably mounted on said frame, means for rotating said drum, plate holding means carried by said drum adjacent each face thereof and movable relative thereto for supporting and firmly individually holding a pair of battery plates on each face of the drum, means adjacent the sides of said drum for cutting the lugs of a supported and held pair of plates to a predetermined length while the drum is rotating, means adjacent the sides of said drum for cleaning the lugs of a supported and held pair of plates while the drum is rotating, means cooperating with said drum for breaking out the web joining the two individual plates of a supported and held pair of plates while the drum is rotating and after the lugs have been cut and cleaned, and means acting on each plate holding means after the pair of plates held thereby has been separated by breaking out the connecting web to move the plate holding means to plate releasing position.

37. The combination as defined in claim 36 and in which the said means for cutting the lugs comprise rotatable cutters mounted adjacent the sides of said drum, the said cleaning means comprise cooperating brush members mounted adjacent the sides of said drum, and means are provided to simultaneously adjust the said cutters and cleaning members relative to said drum.

38. In an apparatus for operating upon pairs of storage battery plates united by an integral web and having lugs extending outwardly at opposite sides thereof, a frame, a polygonally shaped drum rotatably mounted on said frame, means for rotating said drum, individually operable means carried by said drum adjacent each face thereof and movable relative thereto for supporting and individually firmly holding a pair of battery plates on each face of the drum, means adjacent the sides of said drum for cutting the lugs of a supported and held pair of plates to a predetermined length while the drum is rotating, means adjacent the sides of said drum for cleaning the lugs of a supported and held pair of plates while the drum is rotating, a rotatable disk cooperating sequentially with the faces of the said drum for breaking out the web joining the two individual plates of a supported and held pair of plates while the drum is rotating and after the lugs have been cut and cleaned, and stationary means sequentially cooperating with each plate holding means to move the latter to plate releasing position after the pair of plates held thereby has been separated by breaking out the connecting web.

39. The combination as defined in claim 38 and further comprising means to rock said cleaning means in timed relationship with the rotation of said drum to maintain the cleaning surfaces thereof substantially parallel with each face of the drum as the latter is rotated past the said cleaning means, thereby preventing twisting or bending of the lugs.

40. In an apparatus for operating upon pairs of storage battery plates united by an integral web and having lugs extending outwardly at opposite sides thereof, a frame, a polygonally shaped drum rotatably mounted on said frame, means for rotating said drum, a plurality of movable fingers carried by said drum adjacent each face thereof and movable relative thereto for supporting and individually firmly holding a pair of battery plates on each face of the drum, means adjacent said drum for cutting the lugs of a supported and held pair of plates to a predetermined length while the drum is rotating, means adjacent said drum for cleaning the lugs of a supported and held pair of plates while the drum is rotating, a rotatable disk sequentially cooperating with each face of said drum for breaking out the web joining the two individual plates of a supported and held pair of plates while the drum is rotating and after the lugs have been cut and cleaned, means for rotating said disk in timed relationship with the rotation of said drum, and means for sequentially moving the plate holding fingers for each drum face to plate releasing position after the pair of plates held thereby has been separated by breaking out the connecting web.

41. In an apparatus for operating upon pairs of storage battery plates united by an integral web and having lugs extending outwardly at opposite sides thereof, a frame, a polygonally shaped drum rotatably mounted on said frame, means for rotating said drum, plate holding means carried by said drum adjacent each face thereof and movable relative thereto for supporting and individually firmly holding a pair of battery plates on each face of the drum, means adjacent said drum for cutting the lugs of a supported and held pair of plates to a predetermined length while the drum is rotating, means adjacent said drum for cleaning the lugs of a supported and held pair of plates while the drum is rotating, means for moving said cleaning means in timed relationship with the rotation of the drum to maintain the cleaning means substantially parallel with each face of said drum as the latter is rotated past said cleaning means, a rotatable disk sequentially cooperating with each face of said drum for breaking out the web joining the two individual plates of a supported and held pair of plates while the drum is rotating and after the lugs have been cut and cleaned, means for rotating said disk in timed relationship with the rotation of said drum, means for bodily moving said disk in timed relationship with the rotation of the drum to maintain the axis of the disk at a substantially uniform distance from each face of said drum as the latter is rotated past said disk, and means acting on each plate holding means after the pair of plates held thereby has been separated by breaking out the connecting web to move the plate holding means to plate releasing position.

42. The combination as defined in claim 41 and further comprising feeding means operated in timed relationship with the rotation of said drum for successively feeding pairs of battery plates, one at a time, into engagement with the succeeding faces of said drum.

43. In an apparatus for operating upon pairs of storage battery plates united by an integral web and having lugs extending outwardly at opposite sides thereof, a frame, a polygonally shaped drum rotatably mounted on said frame, means for rotating said drum, means for supporting a plurality of said pairs of battery plates and for successively feeding said pairs of plates one at a time into engagement with succeeding faces of said drum, plate holding means carried by said drum adjacent each face thereof and movable relative thereto for supporting and firmly holding the pair of battery plates fed into engagement with each face of said drum, means cooperating sequentially with each face of said drum for breaking out the web joining the two individual plates of each supported and held pair of plates while the drum is rotating, and means acting on each plate holding means after the pair of plates held thereby has been separated by breaking out the connecting web to move said plate holding means to plate releasing position.

44. The combination as defined in claim 43 and in which the said means for breaking out the said webs is a rotatable disk successively engaging the webs as the drum is rotated past the disk, the combination further comprising means for operating said feeding means and rotating said disk in timed relationship with the rotation of said drum.

45. The combination as defined in claim 43 and in which the said plate holding means for supporting and holding the pairs of battery plates upon the drum comprises a plurality of movable fingers cooperating with each face of the drum, and the means for moving said fingers relative to each face of the drum in timed relationship with the rotation of the latter to release the individual plates after they have been separated and to thereafter grip an unseparated pair of plates supplied by said feeding means comprises spring means connected to said fingers for moving the latter to plate holding position and stationary cam means adjacent said drum cooperating with said fingers to move the latter to plate releasing position against the force of said spring means.

46. The combination as defined in claim 43 and further comprising means for receiving the separated individual plates from said drum and for moving said individual plates of said pairs of plates to a point of discharge in diverging paths so that their removal from the machine is facilitated.

47. In an apparatus for operating upon pairs of storage battery plates united by an integral web and having lugs extending outwardly at opposite sides thereof, a frame, a polygonally shaped drum rotatably mounted on said frame, means for rotating said drum, means for supporting a plurality of said pairs of battery plates and for successively feeding said pairs of plates one at a time into engagement with succeeding faces of said drum, plate holding means carried by said drum adjacent each face thereof and movable relative thereto for supporting and firmly individually holding thereon a pair of battery plates fed into engagement therewith, means adjacent said drum for cutting the lugs of a supported and held pair of plates to a predetermined length while the drum is rotating, means adjacent said drum for cleaning the lugs of a supported and held pair of plates while the drum is rotating, means sequentially cooperating with each face of said drum for breaking out the web joining the two individual plates of a supported and held pair of plates while the drum is rotating and after the lugs have been cut and cleaned, and means acting on each battery plate holding means after the pair of plates held thereby has been separated by breaking out the connecting web to move said plate holding means to plate releasing position.

48. In an apparatus for operating upon pairs of storage battery plates united by an integral web and having lugs extending outwardly at opposite sides thereof, a frame, a polygonally shaped drum rotatably mounted on said frame and having substantially plate-like faces, means for rotating said drum, means mounted upon said frame for supporting a plurality of said pairs of battery plates and for successively feeding said pairs of plates one at a time into engagement with succeeding faces of said drum, a plurality of movable fingers carried by each face of said drum for receiving a pair of battery plates from said feeding means and for supporting and holding a feed pair of battery plates in firm engagement with each face of the drum, means adjacent said drum for cutting the lugs of the supported and held pairs of plates to a predetermined length while the drum is rotating, means adjacent the sides of said drum for cleaning the lugs of the supported and held pairs of plates while the drum is rotating, means sequentially cooperating with the faces of said drum for breaking out the web joining the two individual plates of a supported and held pair of plates while the drum is rotating and after the lugs have been cut and cleaned, and stationary means for sequentially operating the fingers on each face of the drum to plate releasing position after the pair of plates held thereby has been separated by breaking out the connecting web.

49. A combination as defined in claim 48 and in which the said means for breaking out the web joining the two individual plates of a supported pair of plates comprise a rotatable disk mounted adjacent said drum, the periphery of said disk being adapted to engage the webs of the supported pairs of plates and exert pressure thereon, and a depressible portion in each face of said drum disposed beneath the web portion of the pair of battery plates thereon.

50. A combination as defined in claim 48 and in which the means for breaking out the web connecting the individual battery plates comprise a rotatable disk, means to bodily move said disk to maintain its axis at a substantially uniform distance from each face of said drum as the latter is rotated past said disk, the said means for bodily moving the disk operating to exert a predetermined pressure upon the said web by means of the disk, and a movable portion in each face of said drum disposed in alignment with the web joining the individual battery plates of the pair of plates supported thereon and adapted to move inwardly of the face of the drum, whereby the pressure exerted by said disk forces the said web out of the plane of said plates due to the movement of said movable portion.

51. A combination as defined in claim 48 and in which the means for cleaning said lugs comprise assemblies mounted adjacent either side of said drum, the combination further comprising means for rocking said assemblies in timed relationship with the rotation of said drum to maintain the cleaning surfaces of the cleaning means substantially parallel with each face of the drum as the latter is rotated therepast.

ALFRED R. WILLARD.

References Cited in the file of this patent

UNITED STATES PATENTS

| Number | Name | Date |
|---|---|---|
| 1,019,487 | Lehberger | Mar. 5, 1912 |
| 1,152,460 | Williams | Sept. 7, 1915 |
| 1,372,979 | Norris | Mar. 29, 1921 |
| 1,929,264 | Speck et al. | Oct. 3, 1933 |
| 1,953,170 | Goad | Apr. 3, 1934 |
| 2,201,058 | Staubli | May 14, 1940 |